(12) United States Patent
Kumagai et al.

(10) Patent No.: US 11,323,056 B2
(45) Date of Patent: May 3, 2022

(54) CONTROLLER FOR AC ROTARY ELECTRIC MACHINE

(71) Applicant: Mitsubishi Electric Corporation, Tokyo (JP)

(72) Inventors: Kengo Kumagai, Tokyo (JP); Shinsuke Kayano, Tokyo (JP); Hitoshi Isoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/198,488

(22) Filed: Mar. 11, 2021

(65) Prior Publication Data
US 2021/0376778 A1 Dec. 2, 2021

(30) Foreign Application Priority Data

May 26, 2020 (JP) .............................. JP2020-091124

(51) Int. Cl.
| | | |
|---|---|---|
| *H02P 6/00* | (2016.01) | |
| *H02P 6/14* | (2016.01) | |
| *H02P 25/22* | (2006.01) | |
| *H02P 27/08* | (2006.01) | |
| *H02P 21/06* | (2016.01) | |
| *H02P 21/22* | (2016.01) | |

(52) U.S. Cl.
CPC .............. *H02P 25/22* (2013.01); *H02P 21/06* (2013.01); *H02P 21/22* (2016.02); *H02P 27/08* (2013.01)

(58) Field of Classification Search
CPC .......... H02P 25/22; H02P 21/22; H02P 21/06; H02P 27/08
USPC ..................................................... 318/400.01
See application file for complete search history.

(56) References Cited

U.S. PATENT DOCUMENTS

| | | | |
|---|---|---|---|
| 9,331,630 B2 * | 5/2016 | Van De Wall | ........... G02B 5/09 |
| 2011/0127933 A1 * | 6/2011 | Shimada | ................. B60L 15/20 |
| | | | 318/139 |
| 2012/0068639 A1 * | 3/2012 | Sejimo | ................ H02P 21/0089 |
| | | | 318/400.02 |

FOREIGN PATENT DOCUMENTS

JP          6497231 B2    4/2019

* cited by examiner

*Primary Examiner* — Erick D Glass
(74) *Attorney, Agent, or Firm* — Sughrue Mion, PLLC; Richard C. Turner

(57) ABSTRACT

To provide a controller for AC rotary electric machine which can reduce an electromagnetic exciting force in the execution region of the magnetic flux weakening control. A controller for AC rotary electric machine, in a specific operating region which is set in an operating region of the magnetic flux weakening control, increases a maximum value of amplitude of fundamental wave components of applied voltages applied to windings more than a normal operating region other than the specific operating region; and calculates dq-axis current command values by the magnetic flux weakening control, in a condition in which the maximum value of amplitude of the fundamental wave components of the applied voltages is increased.

17 Claims, 14 Drawing Sheets

NORMAL VOLTAGE MODE

|  |  | ω | | | | |
|---|---|---|---|---|---|---|
|  |  | 0 | ... | ○ | ... | ○ |
| To | 0 | Ia_n,β_n | ... | Ia_n,β_n | ... | Ia_n,β_n |
|  | ... | ... | ... | ... | ... | ... |
|  | ○ | Ia_n,β_n | ... | Ia_n,β_n | ... | Ia_n,β_n |
|  | ... | ... | ... | ... | ... | - |
|  | ○ | Ia_n,β_n | ... | Ia_n,β_n | - | - |

OPERATING REGION OF VOLTAGE INCREASE MODE

VOLTAGE INCREASE MODE

|  |  | ω | | | | |
|---|---|---|---|---|---|---|
|  |  | 0 | ... | ○ | ... | ○ |
| To | 0 | Ia_i,β_i | ... | Ia_i,β_i | ... | Ia_i,β_i |
|  | ... | ... | ... | ... | ... | ... |
|  | ○ | Ia_i,β_i | ... | Ia_i,β_i | ... | Ia_i,β_i |
|  | ... | ... | ... | ... | ... | - |
|  | ○ | Ia_i,β_i | ... | Ia_i,β_i | - | - |

OPERATING REGION OF VOLTAGE INCREASE MODE

CONTROLLER FOR AC ROTARY ELECTRIC MACHINE

INCORPORATION BY REFERENCE

The disclosure of Japanese Patent Application No. 2020-91124 filed on May 26, 2020 including its specification, claims and drawings, is incorporated herein by reference in its entirety.

BACKGROUND

The present disclosure relates to a controller for AC rotary electric machine.

Recently, high torque and higher power are strongly required for the AC rotary electric machine, and the use of IPMSM (Interior Permanent Magnet Synchronous Motor) which can utilize effectively not only magnet torque but also reluctance torque is progressing. However, if the reluctance torque is utilized, the electromagnetic exciting force increases, and vibration is generated in the AC rotary electric machine. For example, if the AC rotary electric machine is used for driving vehicle, it is required to reduce vibration of the AC rotary electric machine from the viewpoint of noise. Therefore, it is required to reduce vibration of the AC rotary electric machine due to the electromagnetic exciting force.

In JP 6497231 B, by delaying the phase of the current vector more than the phase when performing the maximum torque/current control in the dq-axis rotating coordinate system, the d-axis current is decreased and the electromagnetic exciting force is reduced.

SUMMARY

Since the d-axis current increases to the negative direction when performing the magnetic flux weakening control, there is a problem that the electromagnetic exciting force increases. However, in the technology of JP 6497231 B, since the phase of the current vector is delayed more than the phase of the maximum torque/current control, it cannot be used when performing the magnetic flux weakening control which advances the phase of the current vector more than the phase of the maximum torque/current control. In the magnetic flux weakening control, since the phase of the current vector is advanced by limitation of the voltage limit ellipse, the phase of the current vector cannot be delayed easily.

Then, the purpose of the present disclosure is to provide a controller for AC rotary electric machine which can reduce the electromagnetic exciting force in the execution region of the magnetic flux weakening control.

A controller for AC rotary electric machine according to the present disclosure that controls an AC rotary electric machine which is provided with a stator having plural-phase windings and a rotor having a magnet, via an inverter, the controller for AC rotary electric machine including:
 a current detection unit that detects currents which flows into the plural-phase windings;
 a rotation detection unit that detects a rotational angle and a rotational angle speed of the rotor;
 a current control unit that calculates dq-axis current command values on dq-axis rotating coordinate system consisting of a d-axis defined in a rotational angle direction of a magnetic pole of the rotor and a q-axis defined in a direction advanced to the d-axis by 90 degrees in an electrical angle, and calculates plural-phase voltage command values based on the dq-axis current command values, detection values of currents, and the rotational angle; and
 a switching control unit that controls on/off of a plurality of switching devices which the inverter has, based on the plural-phase voltage command values,
 wherein, in a specific operating region which is set in an operating region in which the dq-axis current command values are calculated by magnetic flux weakening control, the current control unit increases a maximum value of amplitude of fundamental wave components of applied voltages applied to the plural-phase windings more than a normal operating region which is an operating region other than the specific operating region; and calculates the dq-axis current command values by the magnetic flux weakening control, in a condition in which the maximum value of amplitude of the fundamental wave components of the applied voltages is increased.

According to the controller for AC rotary electric machine of the present disclosure, in the execution region of the magnetic flux weakening control, dq-axis current command values are limited by the voltage limit ellipse in which the induced voltage generated in the windings coincides with the maximum value of the applied voltages of the windings, the phase of the current vector advances more than the execution time of the maximum torque/current control. However, in the specific operating region which is set in the execution region of the magnetic flux weakening control, since the maximum value of the amplitude of the fundamental wave components of applied voltages is increased more than the normal operating region, the diameter of the voltage limit ellipse can be expanded more than the normal operating region, and the phase of the current vector can be delayed. Therefore, when performing the magnetic flux weakening control, in the specific operating region, the advance amount of the phase of the current vector can be reduced and the electromagnetic exciting force can be reduced.

DETAILED DESCRIPTION OF THE EMBODIMENTS

1. Embodiment 1

Figure 1:
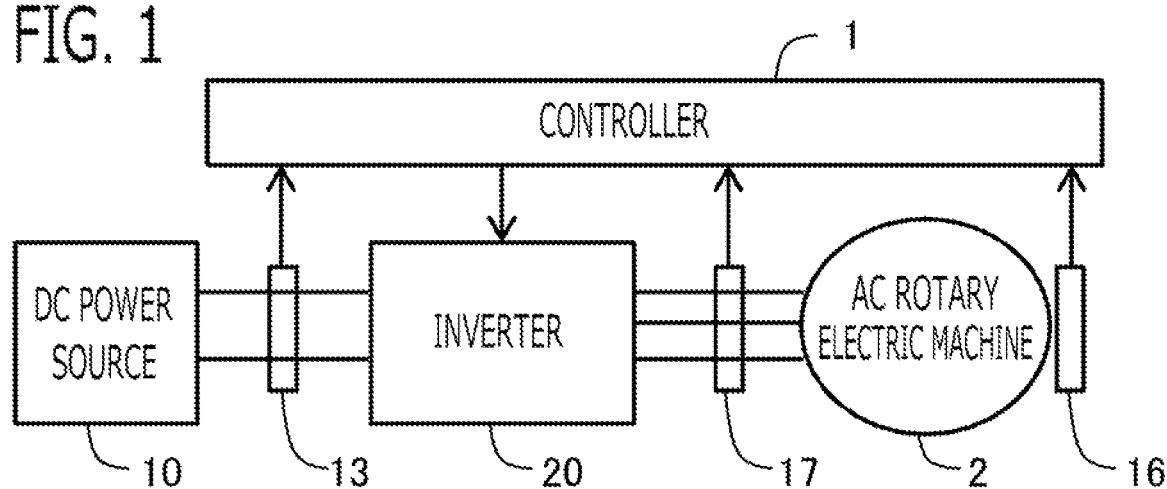
FIG. 1 is a schematic configuration diagram of the AC rotary electric machine and the controller according to Embodiment 1.
Figure 2:
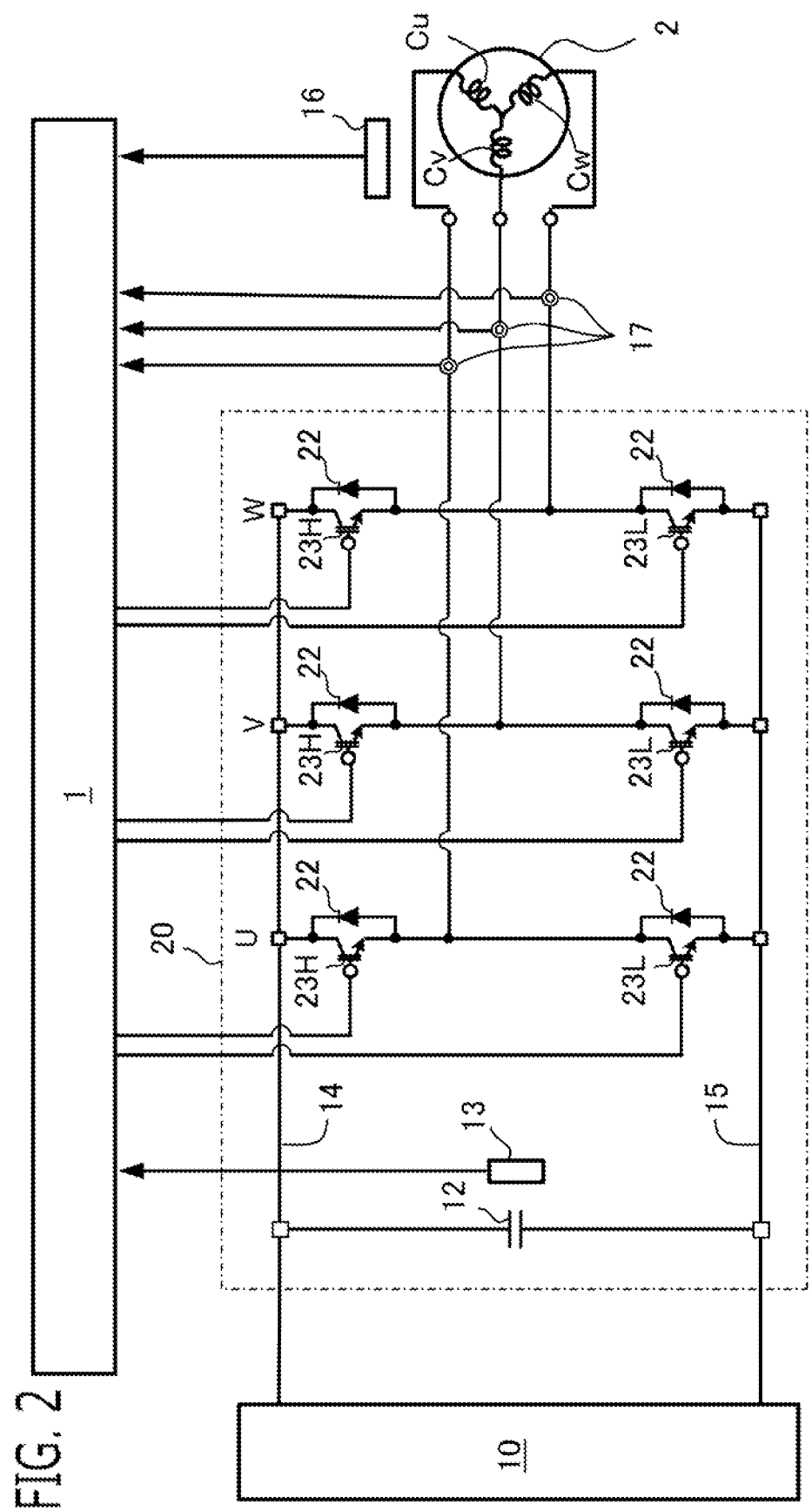
FIG. 2 is a schematic configuration diagram of the AC rotary electric machine and the controller according to Embodiment 1.

A controller for AC rotary electric machine (hereinafter, referred to simply as the controller 1) according to Embodiment 1 will be explained with reference to drawings. Each of FIG. 1 and FIG. 2 is a schematic configuration diagram of the AC rotary electric machine 2 and the controller 1 according to the present embodiment.

1-1. AC Rotary Electric Machine

The AC rotary electric machine 2 is provided with a stator having plural-phase windings, and a rotor having magnets. In the present embodiment, three-phase windings Cu, Cv, Cw of U phase, V phase, and W phase are provided. The three-phase windings Cu, Cv, Cw are connected by star connection. The three-phase windings may be connected by delta connection. The AC rotary electric machine 2 is a permanent magnet type synchronous rotary electric machine, and the magnets are provided in the rotor. In the present embodiment, the permanent magnets are embedded inside the electromagnetic steel plates of the rotor. The permanent magnets may be stuck on the peripheral face of the rotor.

The AC rotary electric machine 2 is provided with a rotation sensor 16 which outputs an electric signal according to a rotational angle of the rotor. The rotation sensor 16 is a Hall element, an encoder, or a resolver. An output signal of the rotation sensor 16 is inputted into the controller 1.

1-2. Inverter

The inverter 20 is an electric power converter which performs power conversion between the DC power source 10 and the three-phase windings, and has a plurality of switching devices. The inverter 20 is provided with three sets of a series circuit (leg) where a positive electrode side switching device 23H (upper arm) connected to the positive electrode side of the DC power source 10 and a negative electrode side switching device 23L (lower arm) connected to the negative electrode side of the DC power source 10 are connected in series, corresponding to respective phase of the three-phase windings. The inverter 20 is provided with a total of six switching devices of the three positive electrode side switching devices 23H, and the three negative electrode side switching devices 23L. Then, a connection node where the positive electrode side switching device 23H and the negative electrode side switching device 23L are connected in series is connected to the winding of the corresponding phase.

Specifically, in each phase of the series circuit, the collector terminal of the positive electrode side switching device 23H is connected to the positive electrode side wire 14, the emitter terminal of the positive electrode side switching device 23H is connected to the collector terminal of the negative electrode side switching device 23L, and the emitter terminal of the negative electrode side switching device 23L is connected to the negative electrode side electric wire 15. The connection node between the positive pole side switching device 23H and the negative pole side switching device 23L is connected to the winding of the corresponding phase. IGBT (Insulated Gate Bipolar Transistor) in which a diode 22 is connected in inverse parallel, FET (Field Effect Transistor) in which a diode is connected in inverse parallel, MOSFET (Metal Oxide Semiconductor Field Effect Transistor) which has a function of diode connected in inverse parallel, bipolar transistor in which a diode is connected in inverse parallel, or the like is used for the switching device. A gate terminal of the each switching device is connected to the controller 1. The each switching device is turned on or turned off by the control signal outputted from the controller 1.

A smoothing capacitor 12 is connected between the positive electrode side wire 14 and the negative electrode side wire 15. A power source voltage sensor 13 which detects a power source voltage supplied to the inverter 20 from the DC power source 10 is provided. The power source voltage sensor 13 is connected between the positive electrode side electric wire 14 and the negative electrode side electric wire 15. An output signal of the power source voltage sensor 13 is inputted to the controller 1.

The current sensor 17 outputs an electric signal according to current which flows into the winding of each phase. The current sensor 17 is provided on the each phase wire which connects the series circuit of the switching devices and the winding. An output signal of the current sensor 17 is inputted into the controller 1. The current sensor 17 may be provided in the series circuit of each phase.

A chargeable and dischargeable electricity accumulation device (for example, a lithium ion battery, a nickel hydoride battery, an electrical double layer capacitor) is used for the DC power source 10. A DC-DC converter which is a DC electric power converter which steps up or steps down the DC voltage may be provided in the DC power source 10.

1-3. Controller 1

Figure 3:
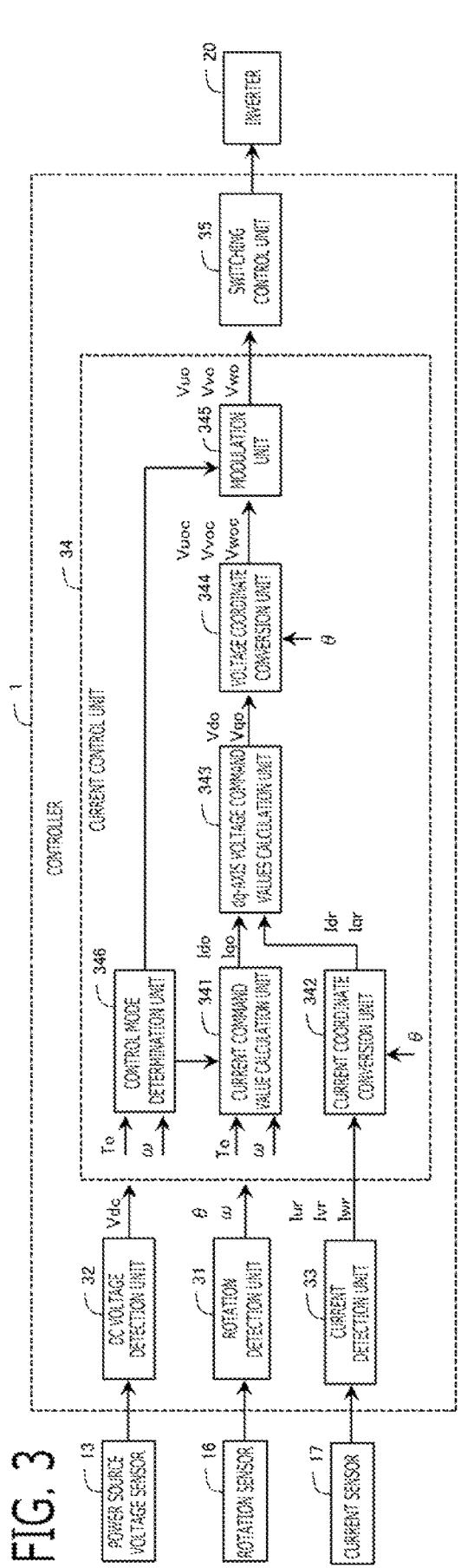
FIG. 3 is a schematic block diagram of the controller according to Embodiment 1.
Figure 4:
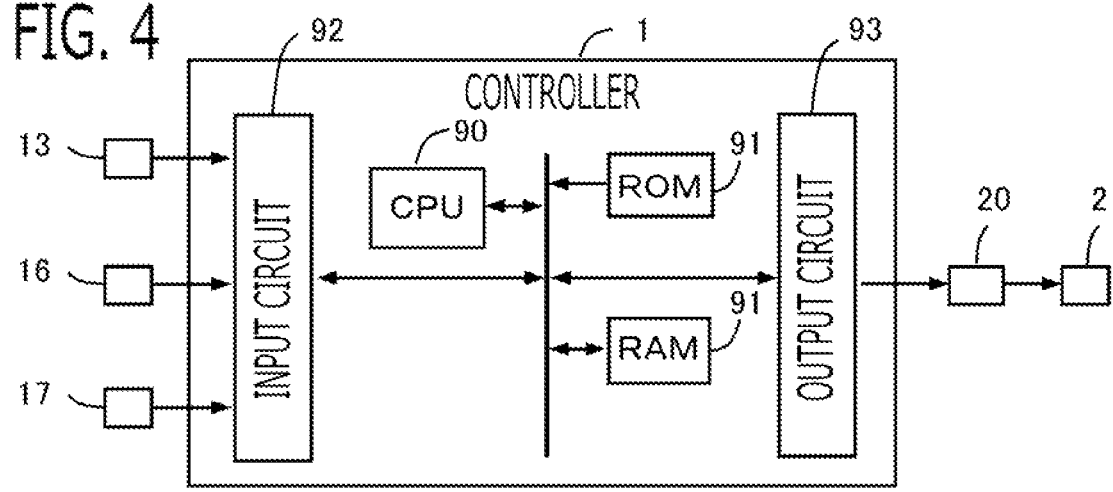
FIG. 4 is a schematic hardware configuration diagram of the controller according to Embodiment 1.

The controller 1 controls the AC rotary electric machine 2 via the inverter 20. As shown in FIG. 3, the controller 1 is provided with a rotation detection unit 31, a DC voltage detection unit 32, a current detection unit 33, a current control unit 34, a switching control unit 35, and the like which are described below. Each function of the controller 1 is realized by processing circuits provided in the controller 1. Specifically, as shown in FIG. 4, the controller 1 is provided with, as a processing circuit, an arithmetic processor (computer) such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. The input circuit 92 is connected with various kinds of sensors and switches such as the power source voltage sensors 13, the rotation sensor 16, and the current sensor 17, and is provided with A/D converter and the like for inputting output signals from the sensors and the switches to the arithmetic processor 90. The output circuit 93 is connected with electric loads such as a gate drive circuit which drive on/off of the switching devices, and is provided with a driving circuit and the like for outputting a control signal from the computing processing unit 90.

Then, the arithmetic processor 90 runs software items (programs) stored in the storage apparatus 91 such as a ROM and collaborates with other hardware devices in the controller 1, such as the storage apparatus 91, the input circuit 92, and the output circuit 93, so that the respective functions of the control units 31 to 35 of FIG. 2 provided in the controller 1 are realized. Setting data items such as maps and reference value to be used in the control units 31 to 35 are stored, as part of software items (programs), in the storage apparatus 91 such as a ROM. Each function of the controller 1 will be described in detail below.

1-3-1. Rotation Detection Unit 31

The rotation detection unit 31 detects a rotational angle θ and a rotational angle speed ω of the rotor in the electrical angle. In the present embodiment, the rotation detection unit 31 detects the rotational angle θ and the rotational angle speed ω of the rotor based on the output signal of the rotation sensor 16. The rotation detection unit 31 detects the rotational angle θ of the magnetic pole (N pole) of the rotor on the basis of the winding position of U phase. The rotation detection unit 31 may estimate the rotational angle without using the rotation sensor, based on current information which are obtained by superimposing a harmonic wave component on the current command value (so-called, sensorless system).

1-3-2. DC Voltage Detection Unit 32

The DC voltage detection unit 32 detects a DC voltage Vdc supplied to the inverter 20 from the DC power source 10. In the present embodiment, the DC voltage detection unit 32 detects the DC voltage Vdc based on the output signal of the power source voltage sensor 13.

1-3-3. Current Detection Unit 33

The current detection unit 33 detects currents Iur, Ivr, Iwr which flow into three-phase windings. The current detection unit 33 detects the current Iur which flows into the winding of U phase, detects the current Ivr which flows into the winding of V phase, and detects the current Iwr which flows into the winding of W phase, based on the output signal of the current sensor 17. The current sensor 17 may detect the winding currents of two phases, and the winding current of the remaining one phase may be calculated based on the detection values of winding currents of two phases. For example, the current sensor 17 detects the winding currents Ivr, Iwr of V phase and W phase, and the winding current Iur of U phase may be calculated by Iur=−Ivr−Iwr.

1-3-4. Switching Control Unit 35

The switching control unit 35 turns on and off the plurality of switching devices by PWM (Pulse Width Modulation) control based on the three-phase voltage command values Vuo, Vvo, Vwo calculated by the current control unit 34 described below. The switching control unit 35 generates the switching signal which turns on and off the switching device of each phase, by comparing each of three-phase voltage command values with a carrier wave. The carrier wave is a triangular wave which vibrates with an amplitude of half value of the DC voltage Vdc centering on 0 with a carrier frequency. The switching control unit 35 turns on the switching signal when the voltage command value exceeds the carrier wave, and turns off the switching signal when the voltage command value is below the carrier wave. The switching signal is transmitted as it is to the positive electrode side switching device, and a switching signal obtained by reversing the switching signal is transmitted to the negative electrode side switching device. Each switching signal is inputted into the gate terminal of each switching device of the inverter 20 via the gate drive circuit, and each switching device is turned on or turned off.

1-3-5. Current Control Unit 34

The current control unit 34 calculates dq-axis current command values Ido, Iqo on a dq-axis rotating coordinate system, and calculates the three-phase voltage command values Vuo, Vvo, Vwo, based on the dq-axis current command values Ido, Iqo, the detection values of currents, and the rotational angle θ. The dq-axis rotating coordinate system consists of a d-axis defined in a rotational angle direction of the magnetic pole (N pole) of the rotor, and a q-axis defined in a direction advanced to the d-axis by 90 degrees in an electrical angle.

In the present embodiment, the current control unit 34 is provided with a current command value calculation unit 341, a current coordinate conversion unit 342, a dq-axis voltage command values calculation unit 343, a voltage coordinate conversion unit 344, a modulation unit 345, and a control mode determination unit 346.

The control mode determination unit 346 determines whether the mode is a voltage increase mode, or a normal voltage mode. The details of the control mode determination unit 346 will be described below.

The current command value calculation unit 341 calculates a d-axis current command value Ido and a q-axis current command value Iqo. The current command value calculation unit 341 calculates the dq-axis current command values Ido, Iqo of the voltage increase mode, when the mode is the voltage increase mode, and calculates the dq-axis current command values Ido, Iqo of the normal voltage mode, when the mode is the normal voltage mode. The details of the current command value calculation unit 341 will be described below.

The current coordinate conversion unit 342 converts the current detection values of three-phase Iur, Ivr, Iwr into the d-axis current detection value Idr and the q-axis current detection value Iqr on the dq-axis rotating coordinate system, by performing the three-phase/two-phase conversion and the rotating coordinate conversion based on the rotational angle θ.

The dq-axis voltage command values calculation unit 343 performs a current feedback control that changes a d-axis voltage command value Vdo and a q-axis voltage command value Vqo by PI control or the like, so that the d-axis current detection value Idr approaches the d-axis current command value Ido, and the q-axis current detection value Iqr approaches the q-axis current command value Iqo. Feedforward control for non-interfering between the d-axis current and the q-axis current and the like may be performed.

The voltage coordinate conversion unit 344 converts the dq-axis voltage command values Vdo, Vqo into three-phase voltage command values after coordinate conversion Vuoc, Vvoc, Vwoc, by performing the fixed coordinate conversion and the two-phase/three-phase conversion based on the rotational angle θ. These three-phase voltage command values after coordinate conversion Vuoc, Vvoc, Vwoc become sine waves, and correspond to the fundamental wave components of the three-phase voltage command values and the fundamental wave components of the applied voltages of the three-phase windings.

<Amplitude Reduction Modulation>

When the mode is the voltage increase mode, the modulation unit 345 calculates the final three-phase voltage command values Vuo, Vvo, Vwo, by performing an amplitude reduction modulation which applies modulation for reducing the amplitude to three-phase voltage command values after coordinate conversion Vuoc, Vvoc, Vwoc of sine waves. By performing the amplitude reduction modulation, the maximum value of the amplitude of the fundamental wave components of the applied voltages of three-phase windings can be increased.

When the mode is the normal voltage mode, the modulation unit 345 sets the three-phase voltage command values after coordinate conversion Vuoc, Vvoc, Vwoc to the final three-phase voltage command values Vuo, Vvo, Vwo as it is, without performing the amplitude reduction modulation.

Various well-known methods, such as the third-order harmonic wave superimposing, the min-max method (pseudo third-order harmonic wave superimposing), the two-phase modulation, and the trapezoidal wave modulation, are used for the method of the amplitude reduction modulation. The third-order harmonic wave superimposing is a method that superimposes a third-order harmonic wave, which has ⅙ of the amplitude of the three-phase voltage command values, on the three-phase voltage command values after coordinate conversion. The min-max method is a method that superimposes ½ of a middle voltage of the three-phase voltage command values after coordinate conversion on the three-phase voltage command values after coordinate conversion. The two-phase modulation is a method that fixes any one phase of the voltage command values to −Vdc/2 or +Vdc/2, and modulates other two phases so that line voltages of the three-phase voltage command values after coordinate conversion do not change. Before and after the amplitude reduction modulation, the line voltages of the three-phase voltage command values are maintained.

A voltage utilization factor M of the three-phase voltage command values is a ratio of an amplitude VA of the fundamental wave components of the three-phase voltage command values Vuo, Vvo, Vwo with respect to a half value of the DC voltage Vdc, as shown in a next equation. The voltage utilization factor M is also called the modulation rate. The fundamental wave components of the three-phase voltage command values coincides with the three-phase voltage command values after coordinate conversion Vuoc, Vvoc, Vwoc. The voltage utilization factor M of the three-phase voltage command values coincides with the voltage utilization factor of the applied voltages of three-phase windings. That is to say, the voltage utilization factor M of the applied voltages of three-phase windings is a ratio of the amplitude of the fundamental wave components of the applied voltages of three-phase windings with respect to the half value of the DC voltage Vdc. The fundamental wave components of the applied voltages of three-phase windings coincide with the three-phase voltage command values after coordinate conversion Vuoc, Vvoc, Vwoc.

$$M = VA/(Vdc/2) \quad (1)$$

If the amplitude reduction modulation is not performed; when the voltage utilization factor M becomes larger than 1, it becomes in the overmodulation state where the amplitude of the three-phase voltage command values Vuo, Vvo, Vwo exceeds the half value of DC voltage Vdc. If the amplitude reduction modulation is performed; when the voltage utilization factor M becomes larger than $2/\sqrt{3}$ ($\approx 1.15$), it becomes in the overmodulation state where the amplitude of the three-phase voltage command values Vuo, Vvo, Vwo exceeds the half value of the DC voltage Vdc. When it becomes in the overmodulation state, the voltages according to the three-phase voltage command values cannot be applied to the three-phase windings, harmonic waves are superimposed on the line voltages of the applied voltages of three-phase windings, and a torque ripple component increases. Then, in the present embodiment, the three-phase voltage command values are set not to become in the overmodulation state. That is to say, in the normal voltage mode and the voltage increase mode, the current control unit 34 changes the voltage utilization factor M within a range where the three-phase voltage command values Vuo, Vvo, Vwo do not exceed the range of the DC voltage Vdc.

<Current Command Value Calculation Unit 341>

In the normal voltage mode in which the amplitude reduction modulation is not performed, the current command value calculation unit 341 sets the dq-axis current command values Ido, Iqo so that the voltage utilization factor M becomes less than or equal to 1; and the amplitude of the three-phase voltage command values Vuo, Vvo, Vwo is set to less than or equal to the half value of the DC voltage Vdc. When the mode is the voltage increase mode in which the amplitude reduction modulation is performed, the current command value calculation unit 341 sets the dq-axis current command values Ido, Iqo so that the voltage utilization factor M becomes larger than 1, and less than or equal to 1.15; and the amplitude of the three-phase voltage command values after the amplitude reduction modulation Vuo, Vvo, Vwo is set to less than or equal to the half value of the DC voltage Vdc. For example, in the voltage increase mode, the voltage utilization factor M is set to 1.15.

1) Normal voltage mode (without the amplitude reduction modulation)

$$M<=1$$

2) Voltage increase mode (with the amplitude reduction modulation)

$$1<M<=1.15 \quad (2)$$

<Maximum Torque/Current Control, Magnetic Flux Weakening Control>

Figure 5:
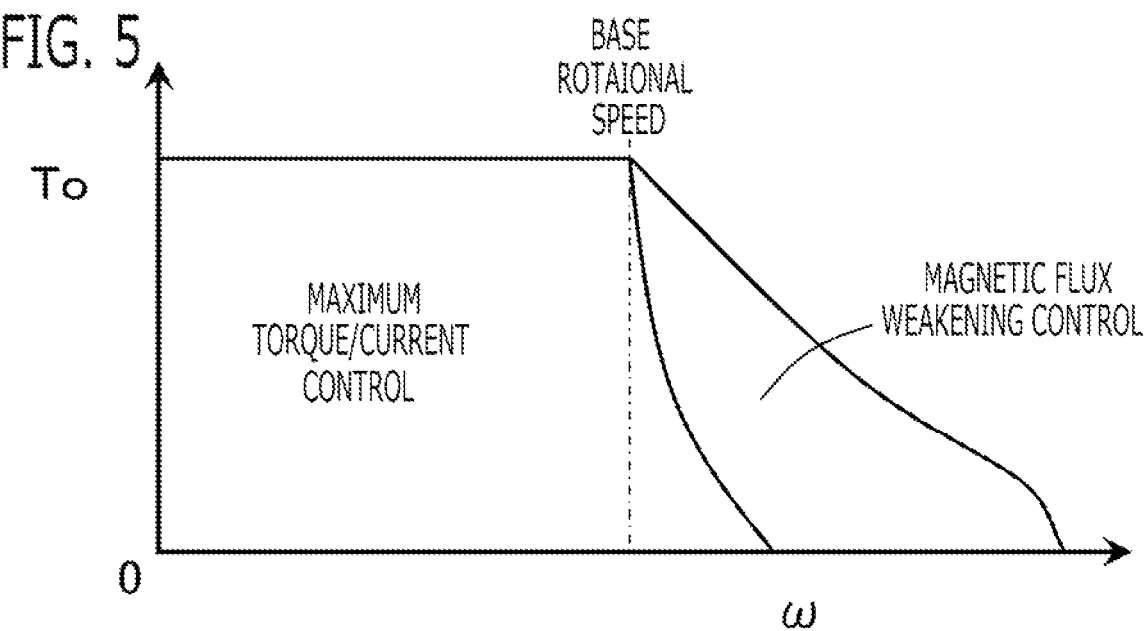
FIG. 5 is a figure for explaining the execution region of the maximum torque/current control and the magnetic flux weakening control according to Embodiment 1.

The current command value calculation unit 341 calculates the dq-axis current command values Ido, Iqo by the maximum torque/current control and the magnetic flux weakening control. FIG. 5 shows an execution region of the maximum torque/current control, and an execution region of the magnetic flux weakening control. The magnetic flux weakening control is performed in a region of high rotational angle speed and high torque.

Figure 6:
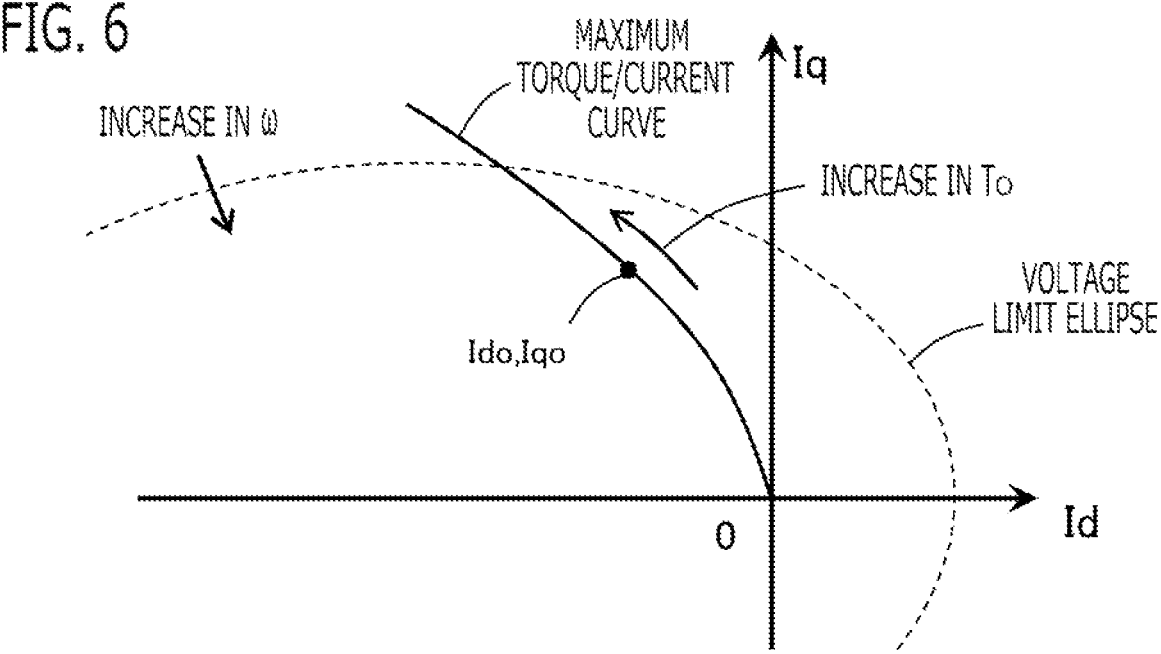
FIG. 6 is a figure for explaining setting of the dq-axis current command values in the maximum torque/current control according to Embodiment 1.

In the maximum torque/current control, the dq-axis current command values Ido, Iqo which minimize current for outputting a torque of the torque command value are calculated. As shown in FIG. 6, as the torque command value To increases, the current command value calculation unit 341 increases the d-axis current command value Ido to the negative direction and increases the q-axis current command value Iqo to the positive direction along the maximum torque/current curve on the dq-axis rotating coordinate system. The maximum torque/current curve is a trajectory of dq-axis currents in which the output torque becomes the maximum for the same current.

When the rotational angle speed ω is lower than the base rotational speed, the dq-axis current command values Ido, Iqo of the maximum torque/current control are upper-limited by the current-limiting circle. On the other hand, when the rotational angle speed ω is higher than the base rotational speed, it switches to the magnetic flux weakening control, when the induced voltage generated in the three-phase windings reaches the maximum value of the applied voltages of three-phase windings, due to the increase in the torque command value To, or the increase in the rotational angle speed ω.

Figure 7:
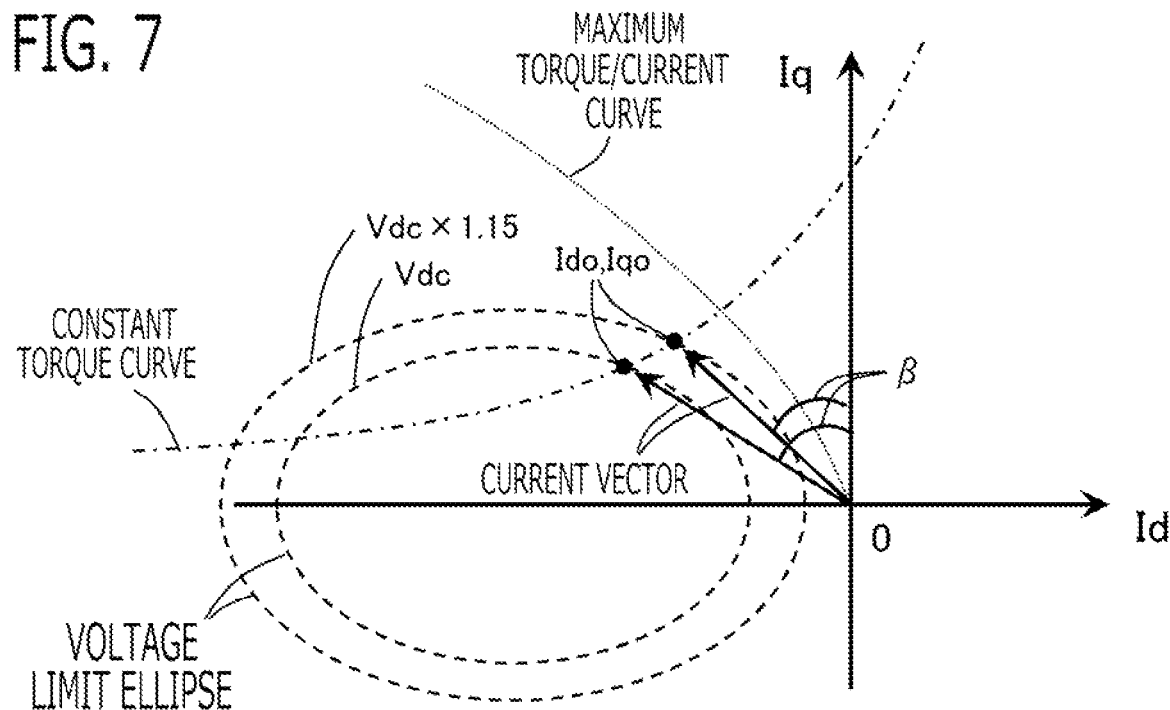
FIG. 7 is a figure for explaining setting of the dq-axis current command values in the specific operating region and the normal operating region when performing the magnetic flux weakening control according to Embodiment 1.

As shown in FIG. 7, in the magnetic flux weakening control, the dq-axis current command values Ido, Iqo are calculated to an intersection point of the voltage limit ellipse (the constant induced voltage ellipse) and the constant torque curve of the torque command value To, on the dq-axis rotating coordinate system. Therefore, in the magnetic flux weakening control, the dq-axis current command values Ido, Iqo in which the voltage utilization factor M of the three-phase voltage command values and the applied voltages of three-phase windings becomes the maximum value of 1 or 1.15, and in which the output torque becomes the torque command value To are calculated.

The constant torque curve is a trajectory of dq-axis currents in which the output torque becomes a constant value. The voltage limit ellipse is a trajectory of dq-axis currents in which the induced voltage of three-phase windings coincides with the maximum value of the applied voltages of three-phase windings. Since the induced voltage increases in proportion to the rotational angle speed ω, the diameter of the voltage limit ellipse becomes small as the rotational angle speed ω increases.

<Decrease of Phase β of Current Vector by Amplitude Reduction Modulation>

The maximum value of the applied voltages of three-phase windings becomes the DC voltage Vdc, when not the performing the amplitude reduction modulation, and it becomes the DC voltage Vdc×1.15, when performing the amplitude reduction modulation. Therefore, as shown in FIG. 7, by performing the amplitude reduction modulation, the diameter of the voltage limit ellipse can be expanded, the d-axis current command value Ido can be increased to the positive direction, and the phase β of a current vector can be delayed.

Figure 8:
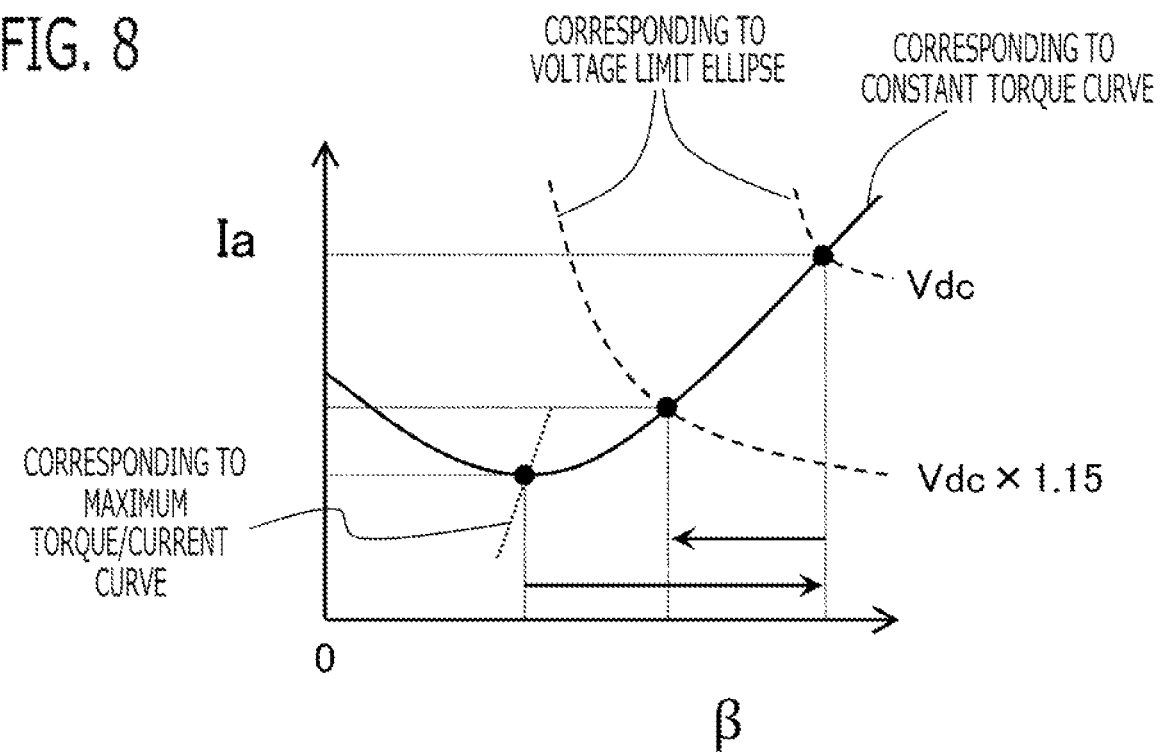
FIG. 8 is a figure for explaining the phase of the current vector in the specific operating region and the normal operating region according to Embodiment 1.

FIG. 8 shows a figure in which the horizontal axis is the phase β of the current vector and the vertical axis is the magnitude Ia of the current vector. In FIG. 8, the constant torque curve at a certain output torque and a certain rotational angle speed is shown. By being limited by the voltage limit ellipse and performing the magnetic flux weakening control, the phase β of the current vector advances more than the maximum torque/current control, and the magnitude Ia of the current vector increases. But, by performing the amplitude reduction modulation, the advance amount of the phase β of the current vector can be reduced, and the increment of the magnitude Ia of the current vector can be reduced.

That is to say, when the mode is the voltage increase mode, the current command value calculation unit 341 calculates the dq-axis current command values Ido, Iqo by the magnetic flux weakening control, in the condition where the voltage utilization factor M is increased more than the normal voltage mode by performing the amplitude reduction modulation. For example, the voltage utilization factor M of the voltage increase mode is set to 1.15.

<Control Mode Determination Unit 346>

The control mode determination unit 346 determines that the mode is the voltage increase mode, when the present operating condition is in a specific operating region which is set in an operating region in which the dq-axis current command values are calculated by the magnetic flux weakening control; and determines that the mode is the normal voltage mode, when the present operating condition is in a normal operating region which is an operating region other than the specific operating region.

In the present embodiment, the control mode determination unit 346 sets the specific operating region corresponding to an operating region in which the dq-axis current command values are calculated by the magnetic flux weakening control, and in which the influence of an electromagnetic exciting force F which is generated between the rotor and the stator becomes larger than a reference value.

The electromagnetic exciting force F is generated by an electromagnetic force between the rotor and the stator. For example, whenever the magnetic path of the field magnetic flux which is generated from the N pole and the S pole of the rotor crosses the opening of the slot of the stator, the electromagnetic force of the radial direction between the stator and the rotor is varied periodically, and the periodic electromagnetic exciting force F is generated. If the d-axis current becomes large to the negative direction, the variation width of the electromagnetic force becomes large. An order of the frequency of the electromagnetic exciting force F with respect to the rotational frequency of the rotor becomes an order according to the number of pole pairs of the rotor, the number of slots, and the like. As the vibration mode of the electromagnetic exciting force F, there is a zero-order vibration mode in which the outer diameter of the stator vibrates to the radial direction at the same time, for example.

When the vibration of the stator due to the electromagnetic exciting force F is transmitted to outside of the motor case, vibration and noise according to the rotational frequency of the rotor are generated. Especially, when the frequency of the electromagnetic exciting force F coincides with the mechanical resonance frequency of the AC rotary electric machine, such as the motor case, vibration and noise become large.

For example, the influence of the electromagnetic exciting force F is one or both of vibration and noise generated by the electromagnetic exciting force F. For example, the influence of the electromagnetic exciting force F is an evaluation value for evaluating one or both of vibration and noise. Alternatively, the influence of the electromagnetic exciting force F may be set to the electromagnetic exciting force F itself. In any case, the operating region where the electromagnetic exciting force F becomes large, and the operating region where the influence of the electromagnetic exciting force F (vibration, noise) becomes large almost coincide to each other. The reference value is set to an upper limit value of the allowable influence of the electromagnetic exciting force F.

<Operating Region Where the Electromagnetic Exciting Force F Becomes Large>

Figure 9:
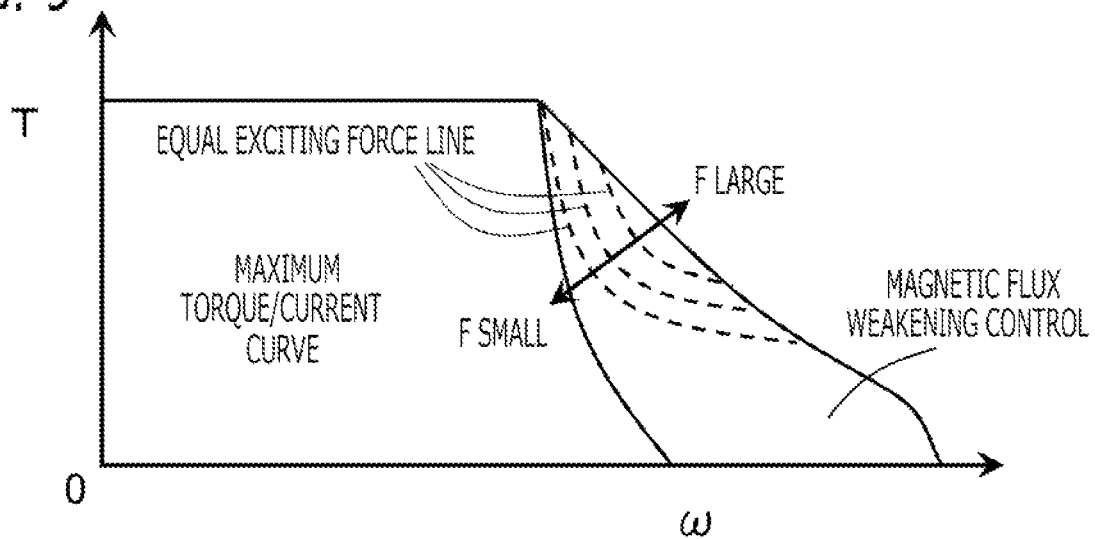
FIG. 9 is a figure for explaining the operating region where the electromagnetic exciting force becomes large according to Embodiment 1.

FIG. 9 shows the operating region of the rotational angle speed ω and the torque T, and an example of a region where the electromagnetic exciting force F becomes large. FIG. 9 shows the equal exciting force lines; and as going to the upper right of high rotational angle speed and high torque, the electromagnetic exciting force F increases. The operating region where the electromagnetic exciting force F becomes large partially overlaps with the execution region of the magnetic flux weakening control.

Figure 10:
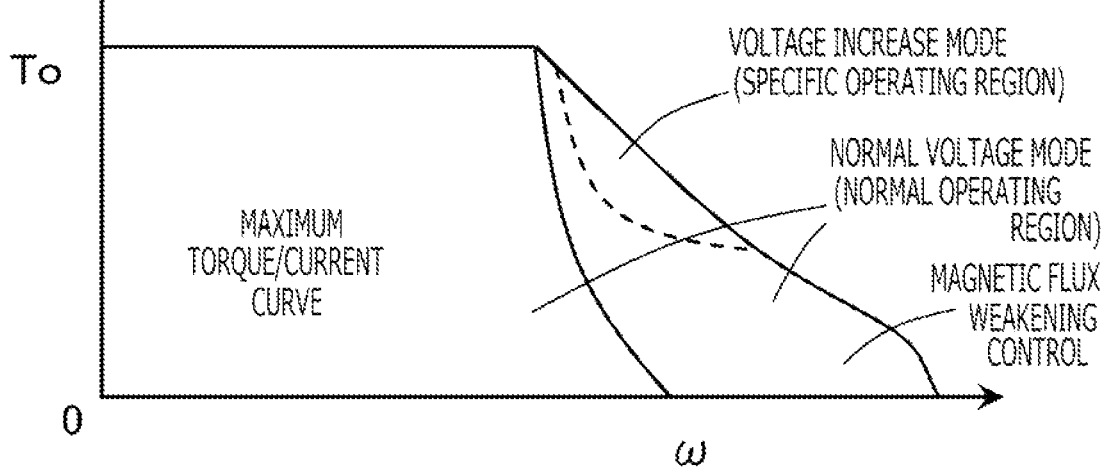
FIG. 10 is a figure for explaining setting of the specific operating region and the normal operating region according to Embodiment 1.

The control mode determination unit 346 determines whether the mode is the voltage increase mode (the specific operating region) or the normal voltage mode (the normal operating region), based on the rotational angle speed ω and the torque command value To. For example, by referring to a mode determination map in which a relationship among the rotational angle speed ω, the torque command value To, the voltage increase mode, and the normal voltage mode is preliminarily set as shown in FIG. 10, the control mode determination unit 346 determines the voltage increase mode or the normal voltage mode corresponding to the present rotational angle speed ω and the present torque command value To.

<Phase β of Current Vector and Electromagnetic Exciting Force F>

Figure 11:
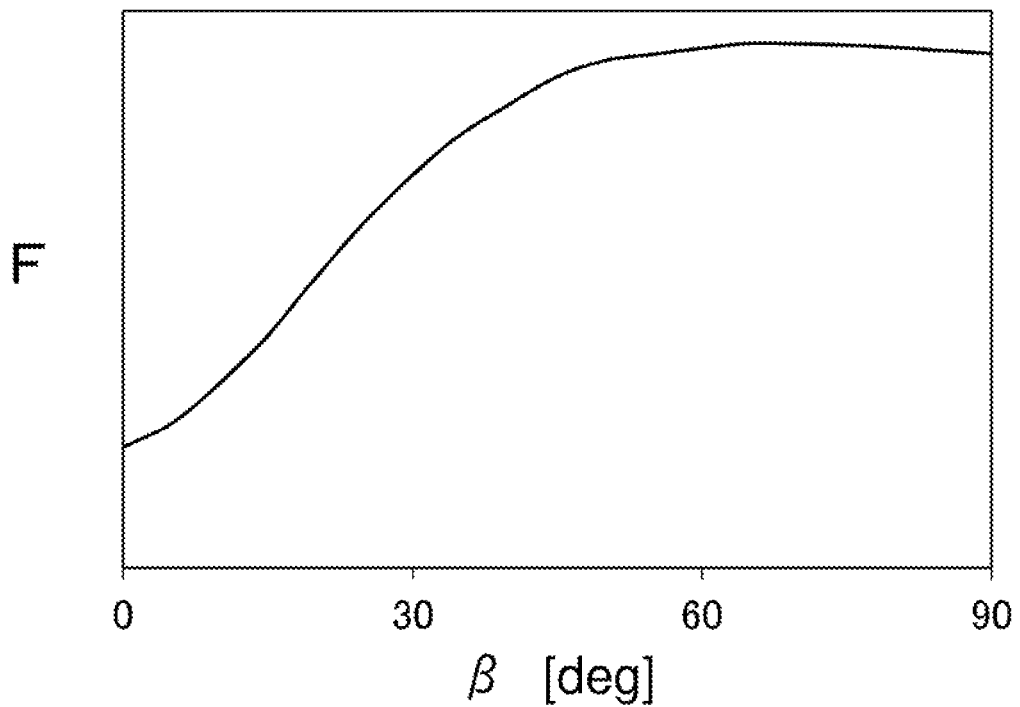
FIG. 11 is a figure for explaining the relation between the phase of the current vector and the electromagnetic exciting force according to Embodiment 1.

FIG. 11 shows an example of relationship between the phase β of the current vector and the electromagnetic exciting force F. As the phase β of the current vector becomes large, the electromagnetic exciting force F becomes large. As explained using FIG. 8, although the phase β of the current vector advances more than the maximum torque/current control when the magnetic flux weakening control is performed, the advance amount of the phase β of the current vector can be reduced by applying the amplitude reduction modulation. Therefore, by performing the amplitude reduction modulation in the specific operating region where the influence of the electromagnetic exciting force F becomes larger than the reference value, the phase β of the current vector can be reduced and the influence of the electromagnetic exciting force F (vibration, noise) can be reduced.

On the other hand, when the amplitude reduction modulation is performed, the harmonic wave component is superimposed on the applied voltages, and the iron loss increases. Therefore, in an operating region of the magnetic flux weakening control in which the influence of the electromagnetic exciting force F does not need to be reduced, the normal voltage mode is set, the amplitude reduction modulation is not performed, and the iron loss is prevented from increasing.

<Setting of Current Command Value>

Figures 12, 13, 14:
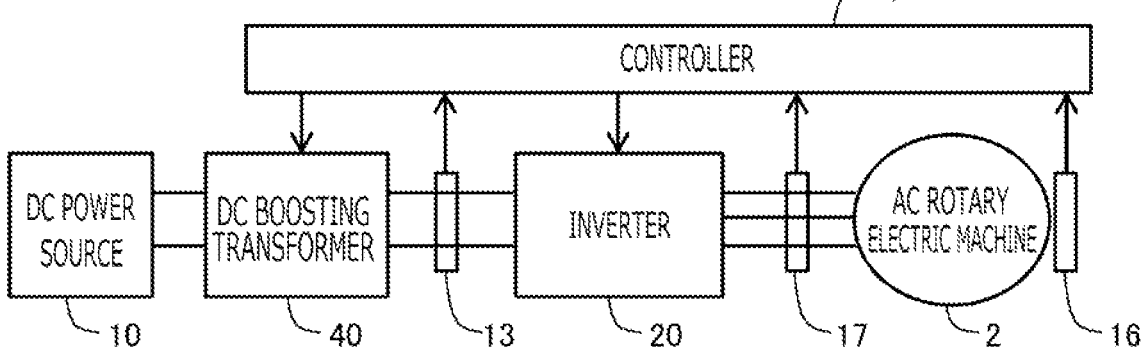
FIG. 12 is a figure for explaining the setting map of the current command value of the normal voltage mode according to Embodiment 1.
FIG. 13 is a figure for explaining the setting map of the current command value of the voltage increase mode according to Embodiment 1.
FIG. 14 is a schematic configuration diagram of the AC rotary electric machine and the controller according to Embodiment 2.

In the present embodiment, when the mode is the normal voltage mode, by referring to a current command value map of the normal voltage mode in which a relationship among the rotational angle speed ω, the torque command value To, and a magnitude Ia_n and a phase β_n of the current vector for the normal voltage mode is preliminarily set as shown in FIG. 12, the current command value calculation unit 341 calculates the magnitude Ia_n and the phase β_n of the current vector corresponding to the present rotational angle speed ω and the present torque command value To. Then, the current command value calculation unit 341 calculates the dq-axis current command values Ido, Iqo based on the magnitude Ia_n and the phase β_n of the current vector which were calculated. The dq-axis current command values Ido_n, Iqo_n of the normal voltage mode may be set directly in the current command value map of the normal voltage mode.

On the other hand, when the mode is the voltage increase mode, by referring to a current command value map of the voltage increase mode in which a relationship among the rotational angle speed ω, the torque command value To, a magnitude Ia_i and a phase β_i of the current vector for the voltage increase mode is preliminarily set as shown in FIG. 13, the current command value calculation unit 341 calculates the magnitude Ia_i and the phase β_i of the current vector corresponding to the present rotational angle speed ω and the present torque command value To. Then, the current command value calculation unit 341 calculates the dq-axis current command values Ido, Iqo based on the magnitude Ia_i and the phase β_i of the current vector which were calculated. The dq-axis current command values Ido_i, Iqo_i of the voltage increase mode may be set directly in the current command value map of the voltage increase mode.

A hatched operating region in FIG. 12 and FIG. 13 corresponds to the voltage increase mode (the specific operating region). In the current command value map of the normal voltage mode of FIG. 12, data of the operating region corresponding to the voltage increase mode may not be set; and in the current command value map of the voltage increase mode of FIG. 13, data other than the operating region corresponding to the voltage increase mode may not be set.

2. Embodiment 2

The AC rotary electric machine 2 and the controller 1 according to Embodiment 2 will be explained. The explanation for constituent parts the same as those in Embodiment 1 will be omitted. The basic configuration of the AC rotary electric machine 2 and the controller 1 according to the present embodiment is the same as that of Embodiment 1. Embodiment 2 is different from Embodiment 1 in that a DC boosting transformer 40 is provided, and the DC voltage Vdc is stepped up by the DC boosting transformer 40 in the voltage increase mode. FIG. 14 is a schematic configuration diagram of the AC rotary electric machine 2 and the controller 1 according to the present embodiment.

Between the DC power source 10 and the inverter 20, the DC boosting transformer 40 which steps up the DC voltage Vdc is provided. A DC-DC converter, such as a step-up chopper circuit, is used for the DC boosting transformer 40; and it steps up the DC voltage outputted from the DC power source 10, and supplies to the inverter 20.

Figure 15:
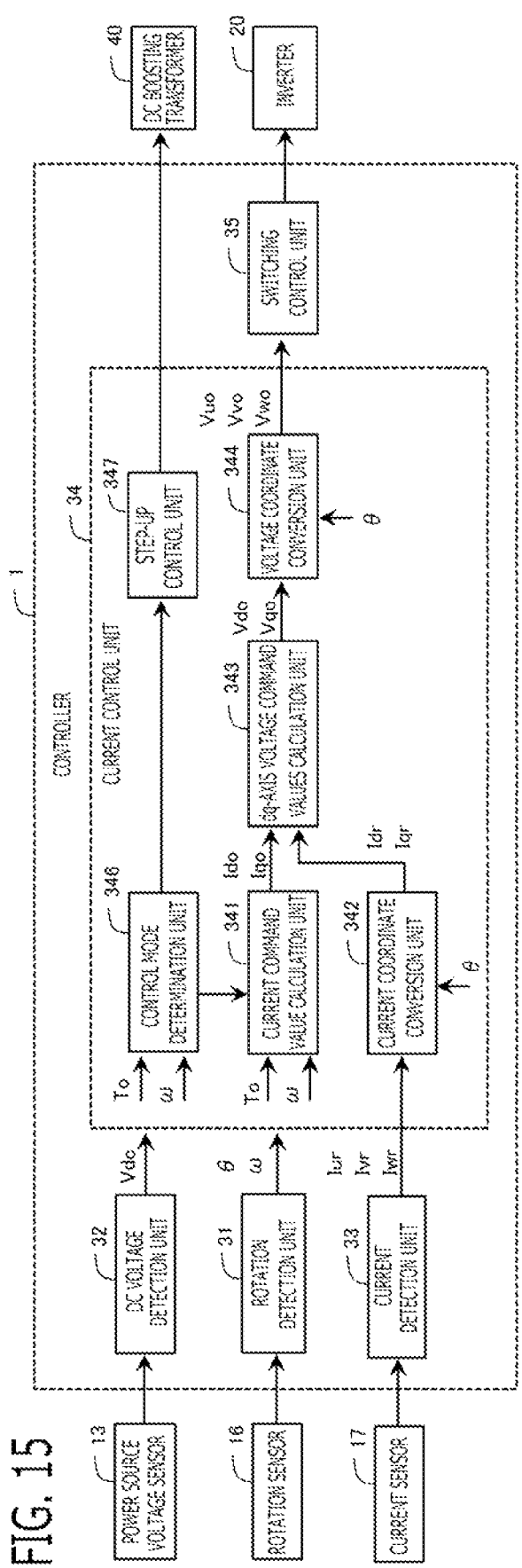
FIG. 15 is a schematic block diagram of the controller according to Embodiment 2.

In the present embodiment, as shown in FIG. 15, the current control unit 34 is provided with a step-up control unit 347, in addition to the current command value calculation unit 341, the current coordinate conversion unit 342, the dq-axis voltage command values calculation unit 343, the voltage coordinate conversion unit 344, and the control mode determination unit 346. In the present embodiment, the current control unit 34 is not provided with the modulation unit 345, the three-phase voltage command values after coordinate conversion Vuoc, Vvoc, Vwoc are calculated as the three-phase voltage command values Vuo, Vvo, Vwo.

As shown in the equation (1), if the DC voltage Vdc is stepped up; even when the voltage utilization factor M is 1, the amplitude VA of the fundamental wave components of the three-phase voltage command values can be increased according to a voltage boosting rate.

In the voltage increase mode (the specific operating region), the current control unit 34 increases the voltage boosting rate of the DC boosting transformer 40 more than the normal voltage mode (the normal operating region), increases the maximum value of the amplitude VA of the fundamental wave components of the three-phase voltage command values, and increases the maximum value of the amplitude of the fundamental wave components of the applied voltages to the three-phase windings.

When the mode is the voltage increase mode, the step-up control unit 347 transmits a step-up command to the DC boosting transformer 40, and makes the voltage boosting rate of the DC boosting transformer 40 increase to a setting voltage boosting rate.

On the other hand, when the mode is the normal voltage mode, the step-up control unit 347 does not transmit the step-up command to the DC boosting transformer 40, and does not make the DC boosting transformer 40 step up the DC voltage.

In the normal voltage mode, the current command value calculation unit 341 sets the dq-axis current command values Ido, Iqo so that the voltage utilization factor M becomes less than or equal to 1 in the condition where the DC voltage Vdc is not stepped up; and the amplitude of the three-phase voltage command values Vuo, Vvo, Vwo is set to less than or equal to the half value of the DC voltage Vdc which is not stepped up. In the voltage increase mode, the current command value calculation unit 341 sets the dq-axis current command values Ido, Iqo so that the voltage utilization factor M becomes less than or equal to 1 in the condition where the DC voltage Vdc is stepped up; and the amplitude of the three-phase voltage command values Vuo, Vvo, Vwo is set to less than or equal to the half value of the DC voltage Vdc after stepping-up. For example, in the voltage increase mode, the voltage utilization factor M is set to 1.

In the voltage increase mode, the maximum value of the amplitude of the applied voltages of three-phase windings becomes larger than the normal voltage mode by the voltage boosting rate. Therefore, as similar to FIG. 7 of Embodiment 1, by performing the step-up of the DC voltage in the magnetic flux weakening control, the diameter of the voltage limit ellipse can be expanded, and the d-axis current command value Ido can be increased to the positive direction.

As similar to FIG. 8 of Embodiment 1, by performing the magnetic flux weakening control, the phase β of the current vector advances more than the maximum torque/current control, and the magnitude Ia of the current vector increases. But, by performing the step-up of the DC voltage, the advance amount of the phase β of the current vector can be reduced, and the increment of the magnitude Ia of the current vector can be reduced.

Therefore, by performing the step-up of the DC voltage in the specific operating region where the influence of the electromagnetic exciting force F becomes larger than the reference value, the phase β of the current vector can be reduced and the influence of the electromagnetic exciting force F (vibration, noise) can be reduced.

On the other hand, when the step-up of the DC voltage is performed, the loss of the DC boosting transformer 40 increases. Therefore, in an operating region of the magnetic flux weakening control in which the influence of the electromagnetic exciting force F does not need to be reduced, the normal voltage mode is set, the step-up of the DC voltage is not performed, and the loss of the DC boosting transformer 40 is prevented from increasing.

3. Embodiment 3

Figure 16:
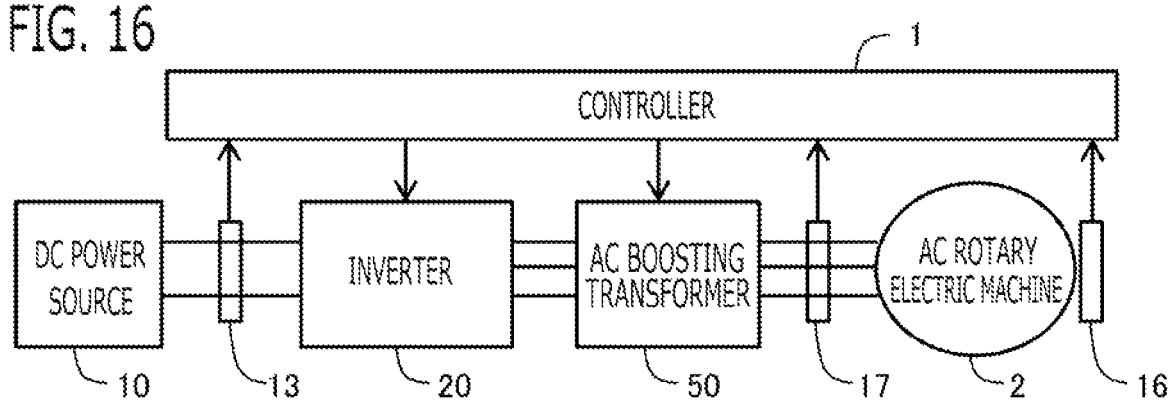
FIG. 16 is a schematic configuration diagram of the AC rotary electric machine and the controller according to Embodiment 3.

The AC rotary electric machine 2 and the controller 1 according to Embodiment 3 will be explained. The explanation for constituent parts the same as those in Embodiment 1 will be omitted. The basic configuration of the AC rotary electric machine 2 and the controller 1 according to the present embodiment is the same as that of Embodiment 1. Embodiment 3 is different from Embodiment 1 in that an AC boosting transformer 50 is provided and the applied voltages to the three-phase windings are stepped up by the AC boosting transformer 50 in the voltage increase mode. FIG. 16 is a schematic configuration diagram of the AC rotary electric machine 2 and the controller 1 according to the present embodiment.

Between the inverter 20 and the three-phase windings of the AC rotary electric machine 2, the AC boosting transformer 50 which steps up the AC applied voltage of each phase is provided. A Slidac which can change a voltage boosting rate is used for the AC boosting transformer 50, for example.

Figure 17:
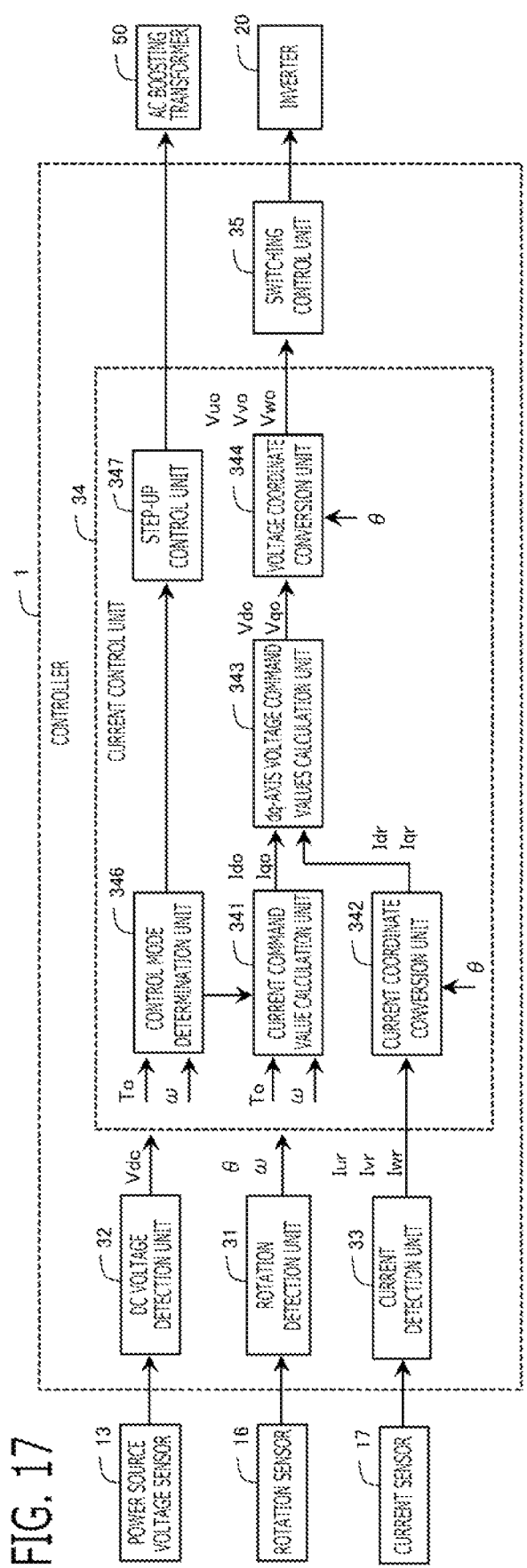
FIG. 17 is a schematic block diagram of the controller according to Embodiment 3.

In the present embodiment, as shown in FIG. 17, the current control unit 34 is provided with a step-up control unit 347, in addition to the current command value calculation unit 341, the current coordinate conversion unit 342, the dq-axis voltage command values calculation unit 343, the voltage coordinate conversion unit 344, and the control mode determination unit 346. In the present embodiment, the current control unit 34 is not provided with the modulation unit 345, and the three-phase voltage command values after coordinate conversion Vuoc, Vvoc, Vwoc are calculated as the three-phase voltage command values Vuo, Vvo, Vwo.

If the applied voltages are stepped up by the AC boosting transformer 50; even when the voltage utilization factor M in the inverter 20 is 1, the amplitude VA of the fundamental wave components of the applied voltages of three-phase can be increased according to the voltage boosting rate.

In the voltage increase mode (the specific operating region), the current control unit 34 increases the voltage boosting rate of the AC boosting transformer 50, and increases the maximum value of the amplitude of the fundamental wave components of the applied voltages of three-phase windings more than the normal voltage mode (the normal operating region).

When the mode is the voltage increase mode, the step-up control unit 347 transmits a step-up command to the AC boosting transformer 50, and makes the voltage boosting rate of the AC boosting transformer 50 increase to a setting voltage boosting rate.

On the other hand, when the mode is the normal voltage mode, the step-up control unit 347 does not transmit the step-up command to the AC boosting transformer 50, and does not make the AC boosting transformer 50 step up the applied voltages.

In the normal voltage mode, the current command value calculation unit 341 sets the dq-axis current command values Ido, Iqo so that the voltage utilization factor M becomes less than or equal to 1 in the condition where the applied voltages are not stepped up; and the amplitude of the three-phase voltage command values Vuo, Vvo, Vwo is set to less than or equal to the half value of the DC voltage Vdc. In the voltage increase mode, the current command value calculation unit 341 sets the dq-axis current command values Ido, Iqo so that the voltage utilization factor M becomes less than or equal to 1 in the condition where the applied voltages are stepped up; and the amplitude of the three-phase voltage command values Vuo, Vvo, Vwo is set to less than or equal to a half value of a value obtained by multiplying the voltage boosting rate to the DC voltage Vdc. For example, in the voltage increase mode, the voltage utilization factor M is set to 1.

In the voltage increase mode, the maximum value of the amplitude of the applied voltages of three-phase windings becomes larger than the normal voltage mode by the voltage boosting rate. Therefore, as similar to FIG. 7 of Embodiment 1, by performing the step-up of the applied voltages in the magnetic flux weakening control, the diameter of the voltage limit ellipse can be expanded, and the d-axis current command value Ido can be increased to the positive direction.

As similar to FIG. 8 of Embodiment 1, by performing the magnetic flux weakening control, the phase β of the current vector advances more than the maximum torque/current control, and the magnitude Ia of the current vector increases. But, by performing the step-up of the applied voltages, the advance amount of the phase β of the current vector can be reduced, and the increment of the magnitude Ia of the current vector can be reduced.

Therefore, by performing the step-up of the applied voltages in the specific operating region where the influence of the electromagnetic exciting force F becomes larger than the reference value, the phase β of the current vector can be reduced and the influence of the electromagnetic exciting force F (vibration, noise) can be reduced.

On the other hand, when the step-up of the applied voltages is performed, the loss of the AC boosting transformer 50 increases. Therefore, in an operating region of the magnetic flux weakening control in which the influence of the electromagnetic exciting force F does not need to be reduced, the normal voltage mode is set, the step-up of the applied voltages is not performed, and the loss of the AC boosting transformer 50 is prevented from increasing.

4. Embodiment 4

Figure 18:
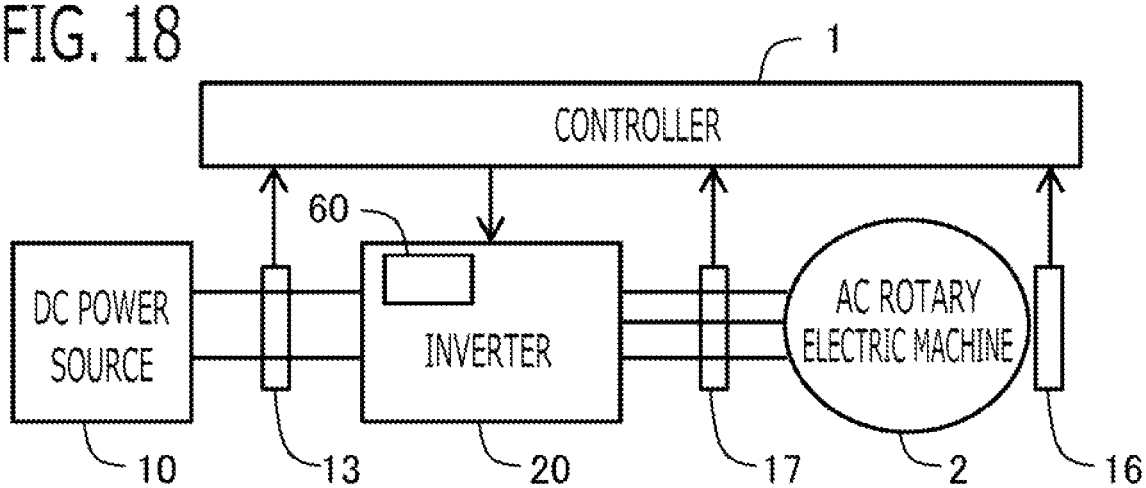
FIG. 18 is a schematic configuration diagram of the AC rotary electric machine and the controller according to Embodiment 4.

The AC rotary electric machine 2 and the controller 1 according to Embodiment 4 will be explained. The DC boosting transformer 40 and the AC boosting transformer 50 may not be provided in the outside of the inverter 20 unlike Embodiment 2 and Embodiment 3. As shown in the schematic configuration diagram of the AC rotary electric machine 2 and the controller 1 of FIG. 18 according to the present embodiment, in the inside of the inverter 20, one or both of a DC boosting circuit which steps up the DC voltage, and an AC step-up circuit which steps up the applied voltages are provided as a step-up circuit 60 in the inverter.

As similar to Embodiment 2 and Embodiment 3, the controller 1 controls the switching device or the actuator which are provided in the step-up circuit 60 in the inverter, and steps up the DC voltage or the AC voltage.

5. Embodiment 5

Figure 19:
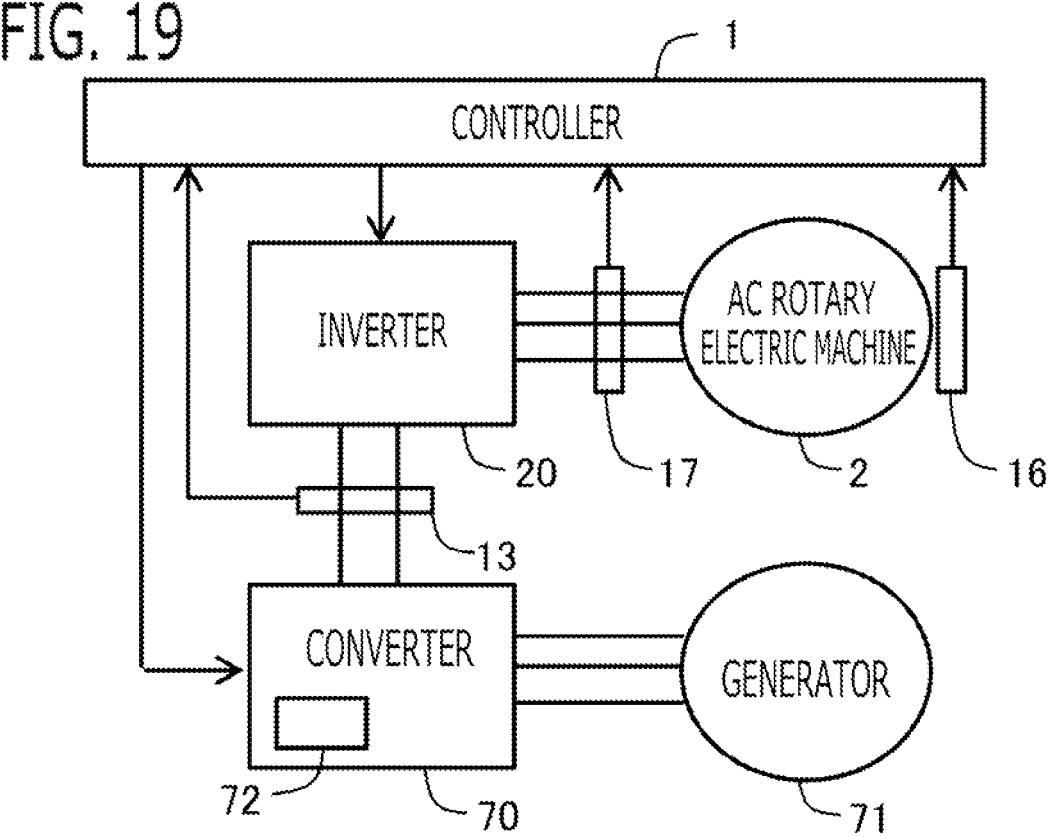
FIG. 19 is a schematic configuration diagram of the AC rotary electric machine and the controller according to Embodiment 5.

The AC rotary electric machine 2 and the controller 1 according to Embodiment 5 will be explained. The explanation for constituent parts the same as those in Embodiment 1 will be omitted. FIG. 19 is a schematic configuration diagram of the AC rotary electric machine 2 and the controller 1 according to the present embodiment.

In the present embodiment, a converter 70 which converts the AC power generated by the generator 71 into DC power and supplies it to the inverter 20 is provided.

The converter 70 is an AC-DC converter which converts AC power into DC power. For example, the generator 71 is an AC generator of three-phase which has three-phase windings, and the converter 70 converts AC power of three-phase into DC power. The converter 70 is provided with a DC boosting circuit 72 which steps up DC voltage after converting AC power into DC power, and supplies it to the inverter 20. The DC boosting circuit 72 is constituted similar to the DC boosting transformer 40 of Embodiment 2.

In the voltage increase mode (the specific operating region), the current control unit 34 increases the DC voltage Vdc supplied to the inverter 20 from the converter 70 more than the normal voltage mode (the normal operating region), increases the maximum value of the amplitude VA of the fundamental wave components of the three-phase voltage command values, and increases the maximum value of the amplitude of the fundamental wave components of the applied voltages to the three-phase windings.

As similar to Embodiment 2, in the voltage increase mode, the current control unit 34 increases the voltage boosting rate of the DC boosting circuit 72 more than the normal voltage mode. As similar to Embodiment 2, in the voltage increase mode or the normal voltage mode, the current control unit 34 sets the dq-axis current command values Ido, Iqo. Since it is configured similar to Embodiment 2, explanation is omitted.

6. Embodiment 6

Figure 20:
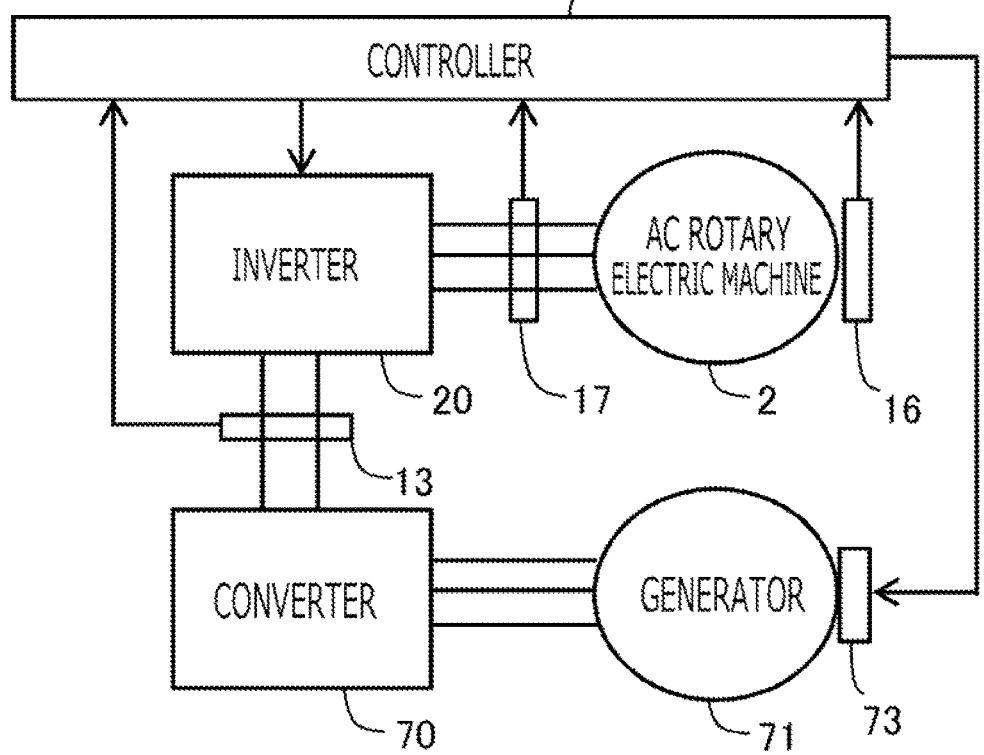
FIG. 20 is a schematic configuration diagram of the AC rotary electric machine and the controller according to Embodiment 6.

The AC rotary electric machine 2 and the controller 1 according to Embodiment 6 will be explained. The explanation for constituent parts the same as those in Embodiment 1 will be omitted. FIG. 20 is a schematic configuration diagram of the AC rotary electric machine 2 and the controller 1 according to the present embodiment.

As similar to Embodiment 5, a converter 70 which converts AC power generated by the generator 71 into DC power, and supplies it to the inverter 20 is provided. Unlike Embodiment 5, the generator 71 has a switcher 73 which changes an electrical characteristics of the induced voltage of windings, and the converter 70 does not have the DC boosting circuit 72. The switcher 73 has an electromagnetic switch, a switching device, or the like which switches connection of windings.

The switcher 73 changes the electrical characteristics of induced voltage of windings by switching the connection of windings. For example, the switcher 73 switches the three-phase windings between Y connection and Δ connection. The induced voltage constant of the Y connection becomes larger than the Δ connection; and the generated AC voltage of the Y connection becomes higher than the Δ connection. Therefore, according to switching of the connection of windings, the DC voltage Vdc supplied to the inverter 20 from the converter 70 changes.

As similar to Embodiment 5, in the voltage increase mode (the specific operating region), the current control unit 34 increases the DC voltage Vdc supplied to the inverter 20 from the converter 70 more than the normal voltage mode (the normal operating region), increases the maximum value of the amplitude VA of the fundamental wave components of the three-phase voltage command values, and increases the maximum value of the amplitude of the fundamental wave components of the applied voltages to the three-phase windings.

Unlike Embodiment 5, in the voltage increase mode, the current control unit 34 switches the switcher 73 so that the induced voltage of windings increases more than the normal voltage mode, and increases the DC voltage Vdc supplied to the inverter 20 from the converter 70 more than the normal voltage mode.

And, as similar to Embodiment 2, in the voltage increase mode or the normal voltage mode, the current control unit 34 sets the dq-axis current command values Ido, Iqo. Since it is configured similar to Embodiment 2, explanation is omitted.

7. Embodiment 7

Figure 21:
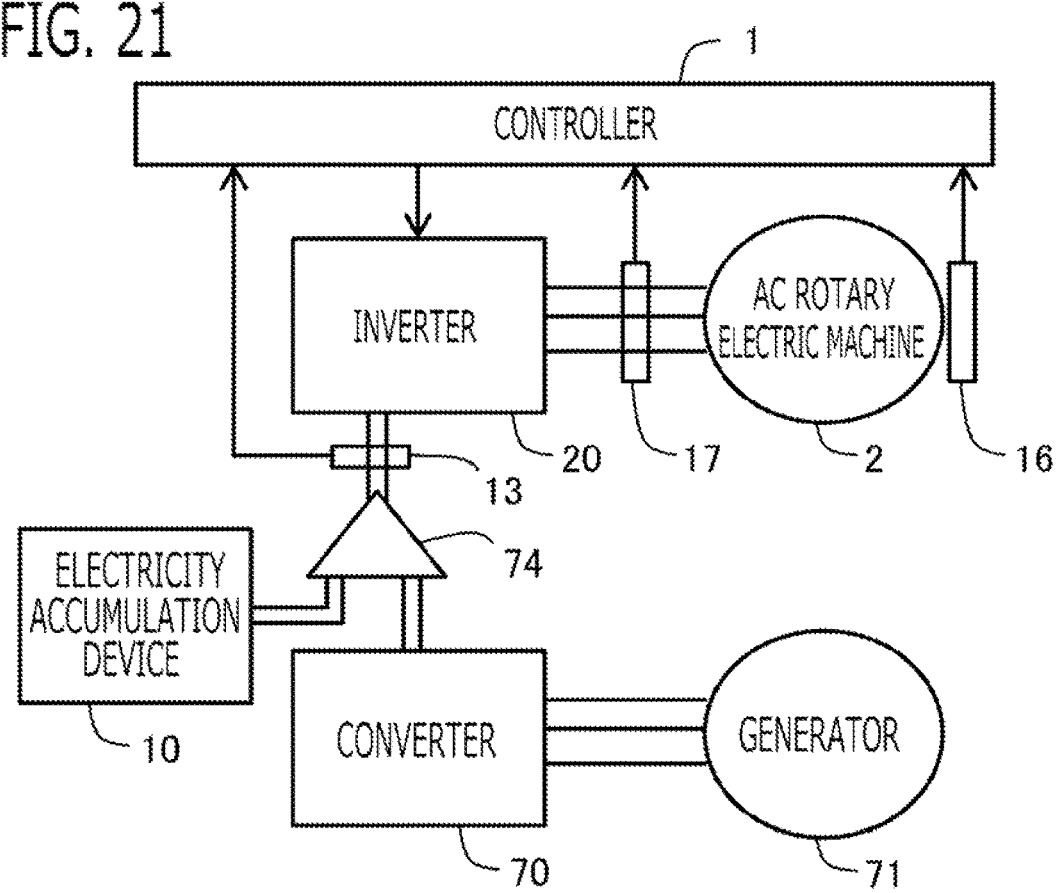
FIG. 21 is a schematic configuration diagram of the AC rotary electric machine and the controller according to Embodiment 7.

The AC rotary electric machine 2 and the controller 1 according to Embodiment 7 will be explained. The explanation for constituent parts the same as those in Embodiment 1 will be omitted. FIG. 21 is a schematic configuration diagram of the AC rotary electric machine 2 and the controller 1 according to the present embodiment.

As similar to Embodiment 5, a converter 70 which converts AC power generated by the generator 71 into DC power, and supplies it to the inverter 20 is provided. An electricity accumulation device 10 is provided as the DC power source 10. Unlike Embodiment 5, a selection circuit 74 which supplies either higher one of DC voltage supplied from the electricity accumulation device 10 and DC voltage supplied from the converter 70, to the inverter 20 is provided. And, the converter 70 does not have the DC boosting circuit 72.

The output voltage of the electricity accumulation device 10 drops due to reduction of charge amount, deterioration, and the like. If it is configured similar to Embodiment 1; when the DC voltage Vdc supplied to the inverter 20 from the electricity accumulation device 10 drops, even if the voltage utilization factor M is controlled to 1.15 in the voltage increase mode, the diameter of the voltage limit ellipse becomes small, the advance amount of the phase β of the current vector increases, and the reduction effect of the electromagnetic exciting force F decreases.

In the present embodiment, since the selection circuit 74 is provided; when the output voltage of the electricity accumulation device 10 drops, the output voltage of the converter 70 is supplied to the inverter 20, and reduction of DC voltage Vdc can be prevented. Therefore, even when the output voltage of the electricity accumulation device 10 drops in the voltage increase mode, the advance amount of the phase β of the current vector is prevented from increasing, and the reduction effect of the electromagnetic exciting force F can be prevented from decreasing.

8. Embodiment 8

Figure 22:
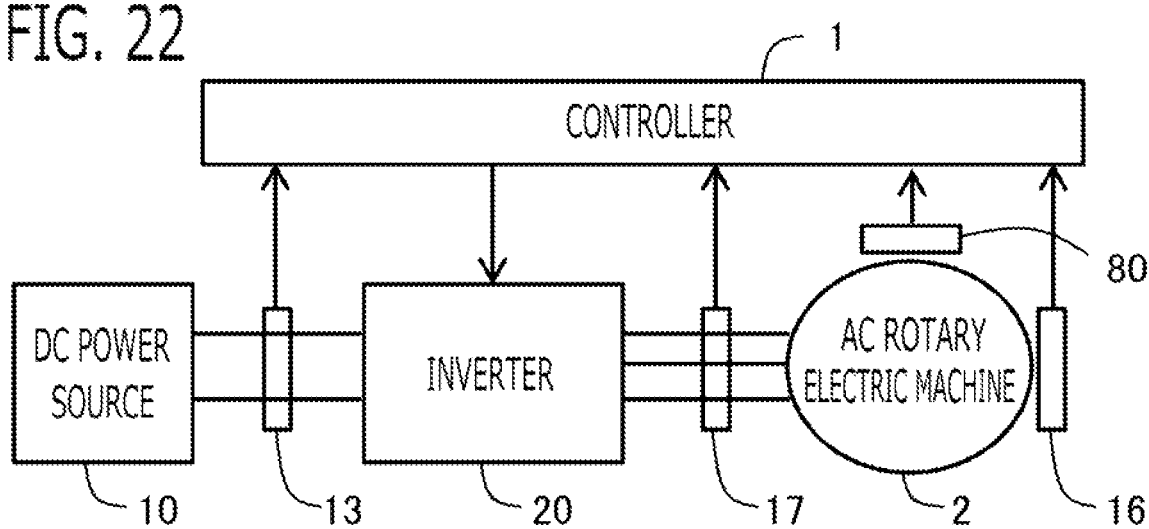
FIG. 22 is a schematic configuration diagram of the AC rotary electric machine and the controller according to Embodiment 8.

The AC rotary electric machine 2 and the controller 1 according to Embodiment 8 will be explained. The explanation for constituent parts the same as those in Embodiment 1 will be omitted. FIG. 22 is a schematic configuration diagram of the AC rotary electric machine 2 and the controller 1 according to the present embodiment.

In the present embodiment, an acceleration sensor 80 to which vibration of the AC rotary electric machine 2 is transmitted is provided. For example, the acceleration sensor 80 is attached to a part of the motor case which becomes antinode of vibration. Alternatively, the acceleration sensor 80 may be attached to a place where vibration should be suppressed, such as a place close to a driving seat, for example. An output signal of the acceleration sensor 80 is inputted into the controller 1.

Unlike Embodiment 1, the control mode determination unit 346 detects vibration by the electromagnetic exciting force F, based on the output signal of the acceleration sensor 80; and sets the specific operating region corresponding to an operating region in which the dq-axis current command values are calculated by the magnetic flux weakening control, and in which the vibration by the electromagnetic exciting force F becomes larger than a reference value. For example, in the execution region of the magnetic flux weakening control, the control mode determination unit 346 determines that the mode is the voltage increase mode (the specific operating region), when the amplitude of acceleration which is vibrating is larger than a preliminarily set reference value; and determines that the mode is the normal voltage mode (the normal operating region), when the amplitude of acceleration is less than or equal to the reference value. The control mode determination unit 346 may perform a band pass filter processing, which takes out a frequency component of the electromagnetic exciting force F according to the rotational angle speed ω, to the output signal of the acceleration sensor 80.

In this way, by using the acceleration sensor 80, vibration which is actually generated by the electromagnetic exciting force F is detected, and vibration can be reduced certainly. For example, in the case that the rotational angle speed at which the electromagnetic exciting force F becomes the maximum does not coincide with the natural vibration frequency, or that the relationship between this rotational angle speed and the natural vibration frequency varies, vibration can be reduced certainly.

9. Embodiment 9

Figure 23:
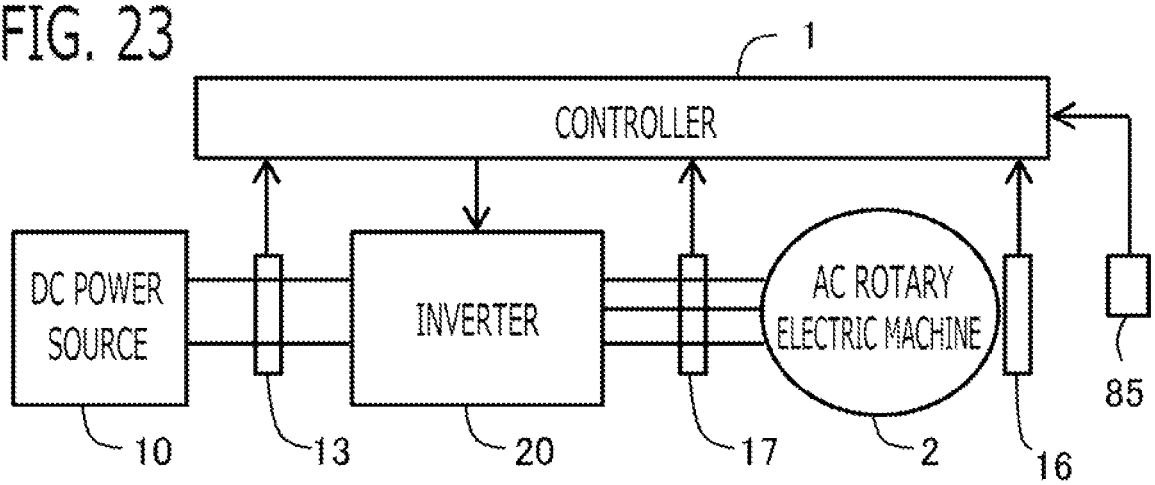
FIG. 23 is a schematic configuration diagram of the AC rotary electric machine and the controller according to Embodiment 9.

The AC rotary electric machine 2 and the controller 1 according to Embodiment 9 will be explained. The explanation for constituent parts the same as those in Embodiment 1 will be omitted. FIG. 23 is a schematic configuration diagram of the AC rotary electric machine 2 and the controller 1 according to the present embodiment.

In the present embodiment, a sound pressure sensor 85 to which sound pressure generated by the AC rotary electric machine 2 is transmitted is provided. For example, the sound pressure sensor 85 is attached to a place where the sound pressure should be suppressed, such as a place close to a driving seat. An output signal of the sound pressure sensor 85 is inputted into the controller 1.

Unlike Embodiment 1, the control mode determination unit 346 detects the sound pressure by the electromagnetic exciting force F, based on the output signal of the sound pressure sensor 85; and sets the specific operating region corresponding to an operating region in which the dq-axis current command values are calculated by the magnetic flux weakening control, and in which the sound pressure by the electromagnetic exciting force F becomes larger than a reference value. For example, in the execution region of the magnetic flux weakening control, the control mode determination unit 346 determines that the mode is the voltage increase mode (the specific operating region), when the detected sound pressure is larger than a preliminarily set reference value; and determines that the mode is the normal voltage mode (the normal operating region), when the sound pressure is less than or equal to the reference value. The control mode determination unit 346 may perform a band pass filter processing, which takes out a frequency component of the electromagnetic exciting force F according to the rotational angle speed ω, to the output signal of the sound pressure sensor 85.

In this way, by using the sound pressure sensor 85, the sound pressure which is actually generated by the electromagnetic exciting force F is detected, and the sound pressure can be reduced certainly. For example, in the case that the rotational angle speed at which the electromagnetic exciting force F becomes the maximum does not coincide with the natural vibration frequency, or that the relationship between this rotational angle speed and the natural vibration frequency varies, the sound pressure can be reduced certainly.

10. Embodiment 10

The AC rotary electric machine 2 and the controller 1 according to Embodiment 10 will be explained. The explanation for constituent parts the same as those in Embodiment 1 will be omitted.

Unlike Embodiment 1, the control mode determination unit 346 sets the specific operating region corresponding to an operating region in which the dq-axis current command values are calculated by the magnetic flux weakening control, and in which an energy loss which occurs when performing the control of the specific operating region becomes smaller than an energy loss which occurs when performing the control of the normal operating region.

According to this configuration, by comprehensively evaluating the reduction of the energy loss due to the reduction of the magnitude Ia of the current vector by performing the control of the specific operating region, and the increase in the energy loss due to the increase in the applied voltages, the energy efficiency of the whole system can be improved. In the specific operating region, by the increase in the applied voltages, the advance amount of the phase β of the current vector can be reduced, and the electromagnetic exciting force F can be reduced.

By performing analysis or experiment previously, the energy loss is evaluated, and the specific operating region and the normal operating region are set. For example, in the case that the amplitude reduction modulation is performed and the applied voltages are increased in the specific operating region (the voltage increase mode) as similar to Embodiment 1, at an operating condition of a certain rotational angle speed ω and a certain torque command value To in the execution region of the magnetic flux weakening control, an energy loss En of the inverter and the AC rotary electric machine when the amplitude reduction modulation is performed and the applied voltages are increased is compared with an energy loss Eo of the inverter and the AC rotary electric machine when the amplitude reduction modulation is not performed and the applied voltages are not increased. The rotational angle speed ω and the torque command value To at which the energy loss En due to execution of the control of the voltage increase mode goes below the energy loss Eo due to execution of the control of the normal voltage mode are set to the specific operating region (the voltage increase mode); and other operating region is set to the normal operating region (the normal voltage mode).

For example, in the case where the voltage boosting rate of the DC boosting transformer or the AC boosting transformer is increased and the applied voltages are increased in the specific operating region (the voltage increase mode) as similar to Embodiments 2 to 4, at an operating condition of a certain rotational angle speed ω and a certain torque command value To in the execution region of the magnetic flux weakening control, an energy loss En of the boosting transformer, the inverter, and the AC rotary electric machine when the voltage boosting rate of the boosting transformer is increased and the applied voltages are increased is compared with an energy loss Eo of the boosting transformer, the inverter, and the AC rotary electric machine when the voltage boosting rate of the boosting transformer is not increased and the applied voltages are not increased. The rotational angle speed ω and the torque command value To at which the energy loss En due to execution of the control of the voltage increase mode goes below the energy loss Eo due to execution of the control of the normal voltage mode are set to the specific operating region (the voltage increase mode); and other operating region is set to the normal operating region (the normal voltage mode).

Also in Embodiments 5 to 7, an energy loss of the whole system when performing the control of the specific operating region (the voltage increase mode) is compared with an energy loss of the whole system when performing the control of the normal operating region (the normal voltage mode), and the operating region should be set.

The control mode determination unit 346 determines whether the mode is the voltage increase mode (the specific operating region) or the normal voltage mode (the normal operating region), based on the rotational angle speed ω and the torque command value To. For example, as similar to FIG. 10 of Embodiment 1, by referring to a mode determination map in which a relationship among the rotational angle speed ω, the torque command value To, the voltage increase mode, and the normal voltage mode is preliminarily set in consideration of energy loss, the control mode determination unit 346 determines the voltage increase mode or the normal voltage mode corresponding to the present rotational angle speed ω and the present torque command value To.

Alternatively, the AC rotary electric machine 2 and the inverter 20 may be provided with a heat flux sensor. For example, in the case of the configuration of Embodiment 1, each of the AC rotary electric machine 2 and the inverter 20 is provided with the heat flux sensor. In the case of Embodiments 2 to 4, each of the AC rotary electric machine 2, the inverter 20, and the boosting transformer is provided with the heat flux sensor. An output signal of the heat flux sensor is inputted into the controller 1.

The control mode determination unit 346 detects a heat flux radiated outside from each device, based on the output signal of the heat flux sensor, and converts the detected heat flux into the energy loss. Then, in the execution region of the magnetic flux weakening control, the control mode determination unit 346 may determine that the mode is the normal voltage mode (the normal operating region), when total of energy loss detected from each heat flux sensor is greater than or equal to a preliminarily set reference value; and may determine that the mode is the voltage increase mode (the specific operating region), when the total of energy loss is smaller than the reference value.

11. Embodiment 11

The AC rotary electric machine 2 and the controller 1 according to Embodiment 11 will be explained. The explanation for constituent parts the same as those in Embodiment 1 will be omitted.

Unlike Embodiment 1, the control mode determination unit 346 sets the specific operating region corresponding to an operating region in which the dq-axis current command values are calculated by the magnetic flux weakening control, and in which the DC current outputted from the DC power source 10 when performing the control of the specific operating region becomes smaller than the DC current outputted from the DC power source 10 when performing the control of the normal operating region.

According to this configuration, by comprehensively evaluating the reduction of the current consumption due to the reduction of the magnitude Ia of the current vector by performing the control of the specific operating region, and the increase in the current consumption due to the increase in the applied voltages, the current consumption of the whole system can be reduced. In the specific operating region, by the increase in the applied voltages, the advance amount of the phase β of the current vector can be reduced, and the electromagnetic exciting force F can be reduced.

By performing analysis or experiment previously, the DC current is evaluated, and the specific operating region and the normal operating region are set. At an operating condition of a certain rotational angle speed ω and a certain torque command value To in the execution region of the magnetic flux weakening control, the DC current when performing the control of the specific operating region (the voltage increase mode) is compared with the DC current when performing the control of the normal operating region (the normal voltage mode). The rotational angle speed ω and the torque command value To at which the DC current when performing the control of the voltage increase mode is less than the DC current when performing the control of the normal voltage mode are set to the specific operating region (the voltage increase mode); and other operating region is set to the normal operating region (the normal voltage mode).

The control mode determination unit 346 determines whether the mode is the voltage increase mode (the specific operating region) or the normal voltage mode (the normal operating region), based on the rotational angle speed ω and the torque command value To. For example, as similar to FIG. 10 of Embodiment 1, by referring to a mode determination map in which a relationship among the rotational angle speed ω, the torque command value To, the voltage increase mode, and the normal voltage mode is preliminarily set in consideration of DC current, the control mode determination unit 346 determines the voltage increase mode or the normal voltage mode corresponding to the present rotational angle speed ω and the present torque command value To.

Alternatively, the DC power source 10 may be provided with a current sensor. An output signal of the current sensor is inputted into the controller 1. Then, in the execution region of the magnetic flux weakening control, the control mode determination unit 346 may determine that the mode is the normal voltage mode (the normal operating region), when the DC current detected by the current sensor is greater than or equal to a preliminarily set reference value; and may determine that the mode is the voltage increase mode (the specific operating region), when the detected DC current is smaller than the reference value.

EXAMPLE OF CONVERSION

In the above Embodiments, there has been explained the case where the three-phase windings are provided. However, as long as the phase number of windings is plural-phase, it may be set to any number, such as two-phase or four-phase.

In the above Embodiments, there has been explained the case where one set of the three-phase windings and the inverter is provided. However, two or more sets of the three-phase windings and the inverter may be provided, and the control similar to each Embodiment may be performed to each set of the three-phase windings and the inverter.

Although the present disclosure is described above in terms of an exemplary embodiment, it should be understood that the various features, aspects and functionality described in the embodiment are not limited in their applicability to the particular embodiment with which they are described, but instead can be applied, alone or in various combinations to the embodiment. It is therefore understood that numerous modifications which have not been exemplified can be devised without departing from the scope of the present disclosure. For example, at least one of the constituent components may be modified, added, or eliminated.

What is claimed is:

1. A controller for AC rotary electric machine that controls an AC rotary electric machine which is provided with a stator having plural-phase windings and a rotor having a magnet, via an inverter, the controller for AC rotary electric machine comprising:
  a current detector that detects currents which flows into the plural-phase windings;
  a rotation detector that detects a rotational angle and a rotational angle speed of the rotor;
  a current controller that calculates dq-axis current command values on dq-axis rotating coordinate system consisting of a d-axis defined in a rotational angle direction of a magnetic pole of the rotor and a q-axis defined in a direction advanced to the d-axis by 90 degrees in an electrical angle, and calculates plural-phase voltage command values based on the dq-axis current command values, detection values of currents, and the rotational angle; and
  a switching controller that controls on/off of a plurality of switching devices which the inverter has, based on the plural-phase voltage command values,
  wherein, in a specific operating region which is set in an operating region in which the dq-axis current command values are calculated by magnetic flux weakening control, the current controller increases a maximum value of amplitude of fundamental wave components of applied voltages applied to the plural-phase windings more than a normal operating region which is an operating region other than the specific operating region; and calculates the dq-axis current command values by the magnetic flux weakening control, in a condition in which the maximum value of amplitude of the fundamental wave components of the applied voltages is increased.

2. The controller for AC rotary electric machine according to claim 1, wherein the current controller sets the specific operating region corresponding to an operating region in which the dq-axis current command values are calculated by the magnetic flux weakening control, and in which influence of an electromagnetic exciting force which is generated between the rotor and the stator becomes larger than a reference value.

3. The controller for AC rotary electric machine according to claim 1, wherein, in the specific operating region, the current controller performs an amplitude reduction modulation which applies modulation for reducing the amplitude to the plural-phase voltage command values; and
   increases the maximum value of amplitude of the fundamental wave components of the applied voltages, by increasing a maximum value of amplitude of fundamental wave components of the plural-phase voltage command values.

4. The controller for AC rotary electric machine according to claim 3, wherein the current controller sets a voltage utilization factor which is a ratio of an amplitude of fundamental wave components of the plural-phase voltage command values with respect to a half value of a DC voltage supplied to the inverter, to less than or equal to 1 in the normal operating region; and
   sets the voltage utilization factor to more than 1, and less than or equal to 1.15 in the specific operating region.

5. The controller for AC rotary electric machine according to claim 1, wherein the current controller changes an amplitude of fundamental wave components of the plural-phase voltage command values, within a range that the plural-phase voltage command values do not exceed a range of DC voltage supplied to the inverter.

6. The controller for AC rotary electric machine according to claim 1, wherein the AC rotary electric machine is provided with a DC boosting transformer which steps up a DC voltage, between a DC power source and the inverter, and
   wherein, in the specific operating region, the current controller increases a voltage boosting rate of the DC boosting transformer more than the normal operating region; and
   increases the maximum value of amplitude of the fundamental wave components of the applied voltages, by increasing a maximum value of amplitude of fundamental wave components of the plural-phase voltage command values.

7. The controller for AC rotary electric machine according to claim 1, wherein the AC rotary electric machine is provided with an AC boosting transformer which steps up the applied voltage of each phase, between the inverter and the plural-phase windings, and
   wherein in the specific operating region, the current controller increases the maximum value of amplitude of the fundamental wave components of the applied voltages more than the normal operating region, by increasing a voltage boosting rate of the AC boosting transformer.

8. The controller for AC rotary electric machine according to claim 1, wherein the AC rotary electric machine is provided with a converter which converts AC power generated by a generator into DC power, and supplies it to the inverter, and
   wherein in the specific operating region, the current controller increases DC voltage supplied to the inverter from the converter more than the normal operating region; and
   increases the maximum value of amplitude of the fundamental wave components of the applied voltages, by increasing a maximum value of amplitude of fundamental wave components of the plural-phase voltage command values.

9. The controller for AC rotary electric machine according to claim 8, wherein the converter has a DC boosting circuit which steps up DC voltage after converting AC power into DC power, and
   wherein in the specific operating region, the current controller increases a voltage boosting rate of the DC boosting circuit more than the normal operating region.

10. The controller for AC rotary electric machine according to claim 8, wherein the generator has a switcher which changes an electrical characteristics of induced voltage of windings, and
    wherein in the specific operating region, the current controller increases DC voltage supplied to the inverter from the converter more than the normal operating region, by switching the switcher so that the induced voltage of windings increases more than the normal operating region.

11. The controller for AC rotary electric machine according to claim 10, wherein the switcher changes the electrical characteristics of induced voltage of windings by switching connection of windings.

12. The controller for AC rotary electric machine according to claim 1, wherein the AC rotary electric machine is provided with a converter which converts AC power generated by a generator into DC power, and supplies it to the inverter; and is provided with a selection circuit which supplies either higher DC voltage of DC voltage supplied from the DC power source and DC voltage supplied from the converter, to the inverter.

13. The controller for AC rotary electric machine according to claim 1, comprising an acceleration sensor to which vibration of the AC rotary electric machine is transmitted,
    wherein the current controller detects vibration due to an electromagnetic exciting force which is generated between the rotor and the stator, based on an output signal of the acceleration sensor; and sets the specific operating region corresponding to an operating region in which the dq-axis current command values are calculated by the magnetic flux weakening control, and in which the vibration due to the electromagnetic exciting force becomes larger than a reference value.

14. The controller for AC rotary electric machine according to claim 1, comprising a sound pressure sensor to which sound pressure generated by the AC rotary electric machine is transmitted,
    wherein the current controller detects sound pressure due to an electromagnetic exciting force which is generated between the rotor and the stator, based on an output signal of the sound pressure sensor; and sets the specific operating region corresponding to an operating region in which the dq-axis current command values are calculated by the magnetic flux weakening control, and in which the sound pressure due to the electromagnetic exciting force becomes larger than a reference value.

15. The controller for AC rotary electric machine according to claim 1, wherein the current controller sets the specific operating region corresponding to an operating region in which the dq-axis current command values are calculated by the magnetic flux weakening control, and in which an energy loss which occurs when performing control of the specific operating region becomes smaller than an energy loss which occurs when performing control of the normal operating region.

16. The controller for AC rotary electric machine according to claim 15, wherein the AC rotary electric machine and the inverter are provided with a heat flux sensor, and
wherein the current controller determines whether or not it is the specific operating region, based on an output signal of the heat flux sensor.

17. The controller for AC rotary electric machine according to claim 1, wherein the current controller sets the specific operating region corresponding to an operating region in which the dq-axis current command values are calculated by the magnetic flux weakening control, and in which DC current supplied to the inverter when performing control of the specific operating region becomes smaller than DC current supplied to the inverter when performing control of the normal operating region.

* * * * *